United States Patent
von Dombrowski et al.

(10) Patent No.: US 8,437,489 B2
(45) Date of Patent: May 7, 2013

(54) HEARING INSTRUMENT

(75) Inventors: Sven von Dombrowski, Wettingen (CH); Hans Leysieffer, Meilen (CH); Bruno Gabathuler, Stafa (CH)

(73) Assignee: Phonak AG, Stafa (CH)

( * ) Notice: Subject to any disclaimer, the term of this patent is extended or adjusted under 35 U.S.C. 154(b) by 208 days.

(21) Appl. No.: 12/911,101

(22) Filed: Oct. 25, 2010

(65) Prior Publication Data

US 2011/0091061 A1 Apr. 21, 2011

Related U.S. Application Data

(62) Division of application No. 11/036,798, filed on Jan. 14, 2005, now Pat. No. 7,844,065.

(51) Int. Cl.
H04R 25/00 (2006.01)

(52) U.S. Cl.
USPC ............... 381/330; 381/328; 381/381

(58) Field of Classification Search ............ 381/309, 381/320, 322, 324, 325, 326, 327, 328, 330, 381/380, 381; 600/559; 128/864, 867; 181/129, 181/130, 135
See application file for complete search history.

(56) References Cited

U.S. PATENT DOCUMENTS

| | | | |
|---|---|---|---|
| 4,381,830 A | 5/1983 | Jelonek et al. | |
| 4,548,082 A | 10/1985 | Engebretson et al. | |
| 4,727,582 A | 2/1988 | de Vries et al. | |
| 5,002,151 A | 3/1991 | Oliveira et al. | |
| 5,031,219 A | 7/1991 | Ward et al. | |
| 5,201,007 A | 4/1993 | Ward et al. | |
| 5,572,594 A | 11/1996 | Devoe et al. | |
| 5,606,621 A | 2/1997 | Reiter et al. | |
| 5,660,621 A | 8/1997 | Bredt | |
| 5,887,070 A | 3/1999 | Iseberg et al. | |
| 6,349,285 B1 | 2/2002 | Liu et al. | |
| 7,076,076 B2 | 7/2006 | Bauman | |
| 7,317,806 B2 * | 1/2008 | Harvey et al. | ............ 381/328 |
| 2002/0164041 A1 | 11/2002 | Zurek | |
| 2003/0002700 A1 | 1/2003 | Fretz et al. | |
| 2004/0010181 A1 | 1/2004 | Feeley et al. | |
| 2004/0047481 A1 | 3/2004 | Bauman | |
| 2004/0047482 A1 | 3/2004 | Bauman | |
| 2004/0047483 A1 | 3/2004 | Bauman | |

FOREIGN PATENT DOCUMENTS

| | | |
|---|---|---|
| CH | 664057 A5 | 1/1988 |
| DE | 2303194 A | 7/1974 |
| DE | 2721469 A1 | 11/1978 |
| DE | 19634984 A1 | 3/1998 |

(Continued)

*Primary Examiner* — Huyen D Le
(74) *Attorney, Agent, or Firm* — Pearne & Gordon LLP

(57) ABSTRACT

A hearing instrument with at least one microphone and signal processing includes at least two receivers having a different frequency response. At least a first one of the receivers can be placed outside the ear canal, for example in a behind-the-ear component. A behind-the-ear component and an external component can be provided for being placed in the user's ear canal or in the user's ear with a connection link between the behind-the-ear component and the external component. The sound processing means can feed the first receiver with a first signal of a first central frequency and the second receiver with a second signal of a second central frequency. The signal processing means can be one or two signal processing units. A frequency separating filter can have an input operatively connected to an output of the signal processing unit.

14 Claims, 14 Drawing Sheets

FOREIGN PATENT DOCUMENTS

| | | |
|---|---|---|
| DE | 10048337 C1 | 3/2002 |
| EP | 0158391 A1 | 10/1985 |
| EP | 0455203 A2 | 11/1991 |
| WO | 99/07182 A2 | 2/1999 |
| WO | 01/69972 A2 | 9/2001 |
| WO | 2004/025990 A1 | 3/2004 |
| WO | 2004/073349 A2 | 8/2004 |

* cited by examiner

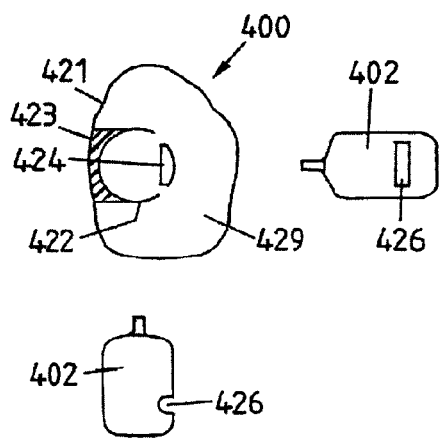
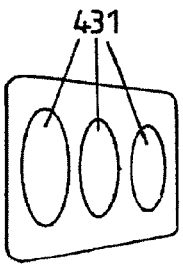
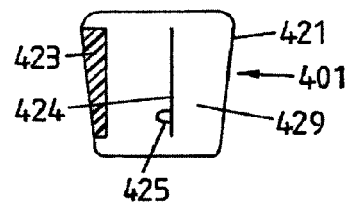
Fig. 41
Fig. 42
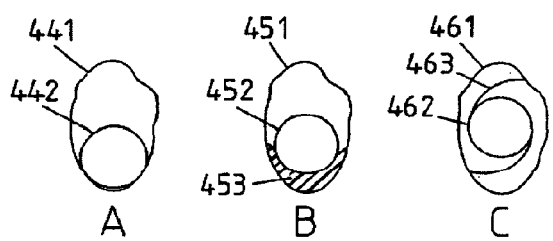
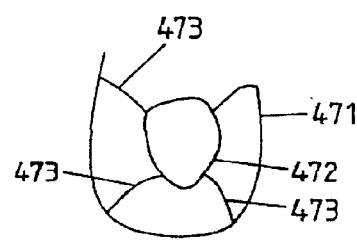
Fig. 43
Fig. 44
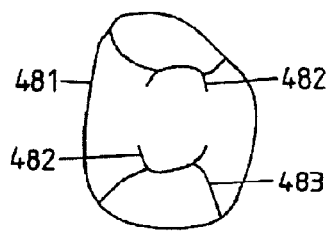
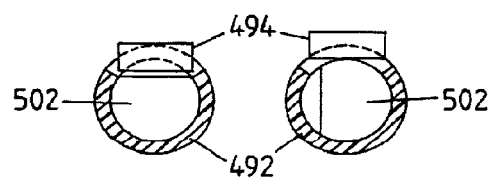
Fig. 45
Fig. 46

HEARING INSTRUMENT

FIELD OF THE INVENTION

The invention relates to hearing instruments, in particular hearing aids.

BACKGROUND OF THE INVENTION

State of the art hearing instruments are usually either behind-the-ear (BTE) hearing devices, in-the-ear (ITE) hearing devices, in-the-canal (ITC) hearing devices or completely-in-the-canal (CIC) hearing devices. BTE hearing devices offer, due to the available space and the resulting possibility to use receivers of larger dimensions, and the opportunity to provide a rather high amplification and to obtain a usually satisfying sound quality. The sound transmission from the BTE device into the user's ear canal has to be done by a sound conduction tube which modifies the sound impression since the signal transmission characteristic is not homogeneous over the entire frequency range. Some of these modifications are wanted, others are unwanted and, if possible, are eliminated by means of acoustic filters in the sound conduction tube. ITE, ITC and CIC hearing devices, in contrast, have a shorter sound conduction tube or none at all. Also, ITC and especially CIC devices are barely visible from the outside and are therefore preferred by many users. However, they have the drawbacks of limited maximum amplification, limited battery lifetime and limited receiver quality, all due to the limited space available. Also the space in the ear canal has to be used efficiently and the ear canal essentially has to be closed by the device so as to minimise acoustic feedback due to the proximity of the sound outlet of the receiver and the sound inlet of the microphone. This plugging of the ear canal may cause undesirable effects, known as occlusion effect which has an impact on the perception of the wearer's own voice and on the wearing comfort.

In order to combine the advantages of BTE devices and of ITC and CIC devices, approaches have been proposed in which a BTE component is combined with an external component to be placed in the ear canal. The external component comprises the receiver.

In the following, different aspects of the mentioned application areas are considered.

Acoustical Performance

The quality of the acoustic signal transmission path of a hearing aid depends on four factors: The sensitivity of the acoustic-to-electric transducer (microphone), the performance of the signal processing unit, the response of the electric-to-acoustic transducer and the acoustic coupling between the electric-to-acoustic transducer output and the ear drum. Electric-to-acoustic transducers ("speakers") in hearing instruments are often termed "receivers", which term is used in the following for electric-to-acoustic transducers in or for hearing instruments of all kinds.

Microphones typically used in hearing aids have a sensitivity that is more or less flat within 10 dB in a frequency range between 100 Hz and 6 kHz. Variations from flat response occur both intentionally or undesired. At higher frequencies, there is often a rapid sensitivity deterioration, typically around 10 kHz, depending on the model. Typical receivers for hearing aids show frequency response curves with very characteristic structures due to the construction of the receiver (size, spout dimensions, etc.). Above 6 kHz typical receivers exhibit a significant fall off of the response curve.

For high quality sound perception, however, the ideal frequency response curve should mimic the natural acoustics of the ear in the range between 20 Hz and about 10 kHz, preferably even between 20 Hz and 16 kHz.

The German patent application publication DE 19634984 describes a hearing aid with several receivers integrated in the otoplastic (the component of the hearing aid which is specifically fit to the ear shape of the wearer and is worn in the ear canal or which at least protrudes into the ear canal). The multiple receivers are supposed to provide an improved sound quality. This hearing aid, however, has the drawback that a special new receiver technology has to be applied (multilayer foil technology) in order to fit the multiple receivers into the ear canal. This receiver technology has not proven to provide sufficient loudness and sound quality at all relevant frequencies and accordingly has not prevailed on the market.

Current hearing aids, therefore, still use only mainly one receiver for sound production. The acoustical performance is limited by the construction and size of the receiver, making it difficult to provide a high quality sound over a wide frequency range.

Connection Between a Hearing Aid Main Component and an External Receiver

Hearing devices, especially hearing aids, that comprise an external receiver placed outside the device's housing (most often in the ear canal or potentially the concha), have the problem that the connection link between the main component (most often the behind-the-ear component) and the receiver has to be adapted to the particular ear geometry of the wearer. Some manufacturers offer an external receiver component comprising a receiver embedded in a housing, a connection link made of flexible, partially pre-shaped and reinforced plastic tubing with two wires establishing the electrical connection between the receiver and the behind-the-ear (BTE) component. The mechanical and electrical interconnection is made by means of a two-pole plug-socket connector. Often, different lengths of a connection link are provided in a set. Such a set is for example described in WO 2004/025990 or in WO 2004/0010181. The disadvantage of such a set-up is that a plurality of interconnection links must be provided to fit the ear geometries. Hence the hearing professional must always have a set of connection links with different lengths in stock.

Other manufacturers offer behind-the-ear hearing aids with an external receiver, which, in contrast, come with a non-detachable interconnection and with one connection link length. The adjustment to the ear geometry causes the BTE component to change its position behind the ear accordingly.

EP 0158391 teaches a BTE with an external receiver with a connection link that is adjustable in length. The adjustment can be done either in the BTE component or in the receiver component. The basic principle of the invention is that the electric connection of the wires to the electronics in the BTE housing is fixed, i.e. non-detachable, while the connection link made of a tubular portion can be variably inserted into the hook or the housing of the BTE component, or into the housing of the receiver component.

The disadvantage of the solution proposed by EP 0158391 is that the external receiver assembly is not easily replaceable since the electrical conducting wires are attached to the electronics within the housing in a different way than the connection link. In addition, EP 0158391 does not reveal a method for securely attaching the connection link to the BTE component. In fact, an actual realisation of such a device showed severe problems with regard to the mechanical stability. Careless handling of the device caused a significant stress on the connection link, which may result in wire breaking.

DE 2721469 teaches a method for adjusting the length of the connection link by proposing a flexible print with conducting layers on both sides. This flexible print is folded and inserted in a (plastic) tube such to form an inner and an outer conducting layer. This tube can be cut to length by the hearing professional. The tube is then attached to the BTE component such that, for example, a spike on the BTE component makes electrical contact to the inner conducting layer and a fastening nut makes electrical contact to the outer conducting layer and at the same time provides the mechanical attachment. The mechanical reliability of such a solution is unknown. Also, a faulty length adjustment can not be reversed, since cutting to length is irreversible.

Fixation of a Hearing Instrument or a Component Thereof in the Ear Canal

Comfortable fixation of hearing aids that touch the highly sensitive skin in the portion of the ear canal beyond the isthmus (i.e. medial to the isthmus) has always been an issue with deeply fitted hearing instruments. This is particularly since for this mostly bony section of the ear canal physiological factors related to skin thickness and sensitivity are critical issues. Requirements for fitting such hearing instruments may comprise:

Enable the anchoring of a device safely and comfortably in the bony section, while minimising the pressure against the skin and avoiding friction during insertion, i.e. offer a solution which minimizes pressure and maximizes retention to prevent the walking out of the device (no working itself out)

Allow for atmospheric pressure equalization

Avoid an excessive humidity build-up in the occluded residual volume

Allow to place the device repeatedly at the same position

Avoid infections

Patent literature contains several solutions for fixing a device deeply in the ear canal. The development of such solutions was mainly driven by completely-in-the-canal (CIC) related problems in minimizing acoustic feedback due to the dynamics of the ear canal and/or the wish for avoiding to make ear imprints. Some of the literature describes also acoustic seals that are intended specifically for sealing the bony portion of the ear canal.

Proposed fixation and sealing set-ups comprise:

Soft shells, made of foam or other elastic non porous material (such as silicone)

Soft shells filled with foam

Soft skin layer covering a rigid shell, foam sleeves, silicon rings, etc.

Tips (mushroom like, parachute like, multiple parachutes, ribs, seal rings, jelly or water filled flexible tips and air filled balloons or hearing devices with a mechanically expandable outer fixation structure)

Such set-ups may be custom made or generic. Generic set-ups are solutions that do not require ear impressions.

Although literature related to deep canal (or peritympanic) devices describes devices that are solely anchored by the seal in the bony part, it is not known how reliable such designs are with regard to unwanted displacements or with regard to comfort.

U.S. Pat. No. 5,606,621 discloses a hybrid hearing device with a receiver component separated from the remaining parts of the hearing device, where the microphone, the battery and the signal processing unit is in a BTE-like assembly and where the receiver component (in a CIC like assembly) is placed in the ear canal such that it touches the bony portion of the ear canal. The CIC-like receiver assembly has a custom-made housing which makes contact to the ear canal walls.

US 2004/0047481, US 2004/0047482 and US 2004/0047483 disclose a fixation of the receiver component which is placed in the ear canal and which is connected through a cable with the remaining parts of a hearing device. This is done either with arms extending from the receiver component towards the ear canal walls, or alternatively with a foam disc, in which the receiver is placed, and which has a rim that touches the wall of the ear canal.

As to mounting outward of the isthmus, patent literature describes essentially two types of mounting schemes for hearing instrument components in the ear canal.

Universal-fit earpieces containing a hearing instrument component

Custom-shaped earpieces containing a hearing instrument component

U.S. Pat. No. 5,002,151 discloses a universal fit earpiece with a user-disposable sleeve comprising soft polymeric retarded recovery foam that can be compressed to be freely insertable into a person's ear and allowed to recover to become wedged in the canal. The sleeve is detachably attached to the ear piece of a hearing aid, which includes any sound transmission device. Preferably, the sleeve is detachably attached to the ear piece by mating of screw threads on the sleeve and the ear piece. The ear piece may be a separate component from the hearing aid. The component is made either of rigid or flexible plastic and has connecting portions of various lengths depending on the depth of insertion of the sleeve into the canal. The sleeve may be of various lengths depending on the depth of insertion into the ear canal desired. The sleeve/ear piece assembly may also have a layer of sound transmitting scrim over its central opening to minimise penetration of the connecting portion past the end of the sleeve. A venting system is proposed by means of at least one flute on the exterior surface of the foam sleeve. Deformation of the tip due to the ear canal dimensions will cause the vent cross sections to change unpredictably, such that the acoustic coupling changes correspondingly.

U.S. Pat. No. 5,887,070 discloses an insert earphone in which a piece of foam material is used to resiliently mount a receiver within a chamber portion of a one-piece plastic housing member. The receiver has an output port extending through a central aperture of the piece of foam material and into one end of a passage defined by a tubular portion of the housing member with a damper being disposed in the other end of the passage. The tubular portion is inserted into an ear tip or other coupling device and has an enlarged diameter end section to achieve a locking action. The unitary housing is attached to an ear tip which also made of foam to adapt to the ear canal geometry. No venting is provided for.

U.S. Pat. No. 6,129,174 discloses an acoustic coupler adapted for use with an intra-canal receiver module which can be deeply inserted into the ear canal of the user while making minimal contact with the walls of the ear canal. The minimal contact feature of the invention allows the acoustic coupler to seal the ear canal acoustically and anchor a hearing device at an optimal depth within the ear canal, while maximizing the user's comfort. The acoustic coupler is manufactured from a soft, pliable elastomer that allows it to conform readily to the shape of the ear canal. The acoustic coupler incorporates structural supports that allow the coupler to maintain an acoustical seal and withstand the inward pressure of the ear canal wall while making minimal contact with the ear canal. A vent pathway for control of occlusion effects is also provided.

WO 99/07182 discloses several tips which are attached to a universal receiver housing. None of them is intended to be custom-shaped. The material properties of the acoustic coupler are described as soft and compliant to adapt to the variable and irregular shape of the human ear canal.

WO 01/69972 discloses a flexible tip for a hearing aid including a mushroom shaped tip, an inner portion having a bore and a receiver mounted within the bore. The receiver can be housed and sealed within a receiver housing. The receiver housing can include a spring having a high compliance along a longitudinal axis and transverse axis, to provide flexibility in the flexible tip. The spring can also have a high stiffness along a radial direction about the circumference of the spring to provide support of the flexible tip from radially directed loads.

U.S. Pat. No. 5,572,594 discloses an ear canal device holder for devices other than speaker/microphone amplification systems that are to be inserted into the canal of the human ear. The device holder is made of a flexible silicone material comprising a body and structural support element(s) such that the device is held within the body of the holder and the body and device are secured in the ear by the structural element(s). In addition the device holder minimises the attenuation of sound waves that pass through the ear canal to the tympanic membrane, while maximising comfort and secure fit.

US 2004/0047483 discloses a unitary receiver housing from that is suspended in the ear canal by means of radially extending structural elements such as arms or discs. With the use of arms, which are bent inside the ear canal in order to accommodate the individual shape of the ear canal, open fitting is therefore optimally supported in terms of effective vent size.

WO 2004/100608 and US 2004/0215053 disclose balloon expandable and self expandable hearing devices and receiver modules, being further examples of universal-fit set-ups.

The disadvantage of all universal-fit s receiver or hearing device holder solutions is that the positioning of the receiver within the ear canal is not reproducible. In some cases, such as is described in US 2004/0047483, the effective vent size is a priori not known since it is defined by the ear canal geometry which is intentionally not being directly or indirectly measured by taking ear impressions. The resulting uncertainty of positioning and venting causes variations of the acoustic coupling, which limits the acoustic performance of the hearing aid: the hearing aid's gain may not be optimised for the particular geometry the earpiece assumes when inserted in the ear canal. Further, the assembly is usually not firmly positioned in the ear canal and may walk out and/or may cause a tickling sensation, either during jaw movements or when the assembly is touched from the outside with fingers.

CH 664057 discloses hearing aids with custom shaped components. The subject is a BTE hearing aid with transducers in separate, sound proof housings made such that sound can reach the microphone or be radiated by the receiver only through dedicated openings, i.e. the microphone inlet or the receiver outlet. In one embodiment, the receiver housing is placed within the otoplastic. The otoplastic may have a (conventional) venting.

However, such a set-up with a custom shaped CIC component has the disadvantage that the volume between the CIC component and the tympanic membrane is largely closed which reduces the wearing comfort and increases the occlusion effect. Also, the receiver has to be assembled in special, custom-made set-up. It is not possible to exchange receivers except by replacing the entire CIC component.

US 2004/025990 describes an earpiece auditory device including a behind-the-ear (BTE) component, which includes processing circuitry. In an embodiment, the device also includes a completely-in-canal (CIC) component, shaped to fit into the ear canal of the user such that it touches the bony portion of the ear canal. In some embodiments, the CIC component includes either a universal fit or a custom fit ear mold. The custom fit ear mold can be fabricated using a rapid prototyping technology, in which the contours of the user's ear canal are scanned, and the scan data is used either directly or indirectly to replicate the ear canal contours of that user into the custom fit ear mold. In some embodiments, the ear mold is detachably interconnected with a speaker module, preferably using either an intermediate sleeve or a detachable locking pin assembly. In another embodiment, the speaker module is permanently encapsulated within the ear mold. It is mentioned, that in one embodiment the CIC unit has an open mold configuration or a vent, meaning the ear canal of a user is at least partially open when CIC unit is inserted so deep into user's ear canal as to touch the bony portion.

However, configurations suffer from the drawback that even if the configuration is an open mold configuration or has a vent, it is may be difficult to provide enough air exchange between an inner portion of the ear canal and the outside. Also, such state-of-the-art custom shaped earpieces may usually not be made compressible and cause discomfort during jaw movements.

SUMMARY OF THE INVENTION

It is a first object of the invention to provide a hearing instrument, especially a hearing device, overcoming drawbacks of existing hearing instruments which especially is suited for providing a high quality sound perception. Preferably, the hearing instrument should maintain the possibility to use high quality receivers, which especially in view of the sound quality at low frequencies, have to have a certain minimal size.

According to the first aspect of the invention, a hearing instrument with at least one microphone and signal processing means (usually comprising an amplification functionality) comprises at least two receivers having a different frequency response. At least a first one of the receivers is adapted to be placed outside the ear canal, for example in a behind-the-ear component.

A different frequency response of two receivers may be achieved by a variety of measures, such as different receiver sizes, different geometries, different materials, different wirings, different passive and active electrical components (for example different coils if the receivers are of an inductive type), different physical principles (for example an inductive receiver and a capacitive receiver, or an inductive receiver and a piezoelectric receiver may be used), different outcoupling, combinations of these, etc.

Preferably, the signal processing means are configured so as to feed output signals of different frequencies to the at least two receivers. For example one receiver may be fed with a first output signal, the frequency spectrum of which is such that it essentially comprises signal proportions between 0 and a certain splitting frequency, whereas the other receiver is fed with a second output signal with a frequency spectrum essentially starting at the splitting frequency. In other words, the signal processing means as a whole have implemented the function of a frequency separating filter.

The hearing instrument preferably also comprises a sound conduction element, such as a sound conduction tube connecting the first receiver with the ear canal.

The concept according to the first aspect of the invention features the substantial advantage that it makes an improved overall sound quality possible. Specific receiver designs may be used, for example one receiver optimised for high frequency sounds, and another one for low frequency sounds.

This provides the possibility of enhancing the range with a largely flat frequency response. Nevertheless, receivers of the known kind with the known sizes may be used. Further, the invention provides the possibility of reducing the instrument's power consumption and to reduce unwanted sound modification effects, since receivers and/or sound conducting elements may be operated closer to their resonance frequencies than if only one receiver covering the whole frequency range is used.

Besides the fact that at least two receivers are suited to obtain a wider frequency response, such a solution may also be advantageous in the case where negative impacts on the performance of the hearing instrument due to mechanical vibrations produced by any of the receivers can be reduced by an adequate design which places the components at the most beneficial locations.

In an especially preferred first embodiment, a second one of the receivers is placed in the ear canal. In this embodiment, the sound conduction tube may also comprise an electrical connection from the outside-the-canal (preferably behind-the-ear) component to the second receiver. In a first variant of this embodiment, the first receiver (the one outside the ear canal) is used as a receiver for high frequency sounds (a 'tweeter'), whereas the second receiver serves as a receiver for low frequencies (a 'woofer'). However, it is also possible that the first receiver (the one outside the ear canal) is operated as a woofer and the second one as a tweeter. This second variant is especially preferred in cases where available space is an issue since woofers are usually of larger dimensions than tweeters and hence tweeters can more easily be placed in the ear canal. Additionally, thin diameter sound conduction tubes can be used for the transmission of low frequency sounds. In contrast, high frequency sounds would negatively be affected by smaller diameters due to the acoustic transmission characteristic of a sound conduction tube. This second variant may consequently also be preferred in cases where a high amplification at high frequencies is desired. The second variant may also be preferred where the used sound conduction elements have wanted resonant frequencies at low frequencies.

This first embodiment features the substantial advantage that limited space is used in both, the ear canal and the behind-the-ear component. The required size in the behind-the-ear component is especially small if the high frequency receiver (the "tweeter") is located in the behind-the-ear component.

In another embodiment, both receivers are placed outside the ear canal, for example in the behind-the-ear component. The sound is preferably delivered through a sound conduction channel or through at least two sound conduction channels to the ear canal. In the case of more than one sound conduction channels, the channels may be mechanically coupled to each other. They may for example be formed as two bores in a single sound conduction tube. As an alternative, there may be two separate sound tubes.

In this entire text, "in-the-ear-canal" or "in-the-canal" includes any arrangement where the elements concerned are at least partially placed in the ear canal of a user, including the classical "in-the-canal" (ITC) and "completely-in-the-canal" (CIC) arrangements. "Outside-the-canal" or "outside-the-ear-canal" subsumes elements that are primarily located outside the ear canal and includes behind-the-ear elements, elements placed in the concha or elements at places more remote to the ear canal. An "external" component is a component that is placed outside the housing of a main component of a hearing instrument, such as a component placed outside the BTE component housing. The main component in this respect is usually the component that comprises a better part of the signal processing means (such as a digital signal processor) and a battery compartment.

It is a second object of the invention to provide a hearing device with an external receiver that overcomes drawbacks of prior art hearing devices with external receivers and that provides mechanical stability, variability and does not require an abundance of parts to be delivered with the device.

According to the second aspect of the invention, a hearing instrument comprising at least one acoustic-to-electric input converter (a microphone), a signal processing unit, which preferably includes an amplification functionality and an output converter (a receiver) is provided. At least the signal processing unit—and preferably also a battery compartment and possibly also the at least one microphone—is contained in a behind-the-ear component which fits behind a user's ear. The behind-the-ear component may also comprise a detachable or non-detachable hook. The hearing instrument further comprises an external component for being placed in the user's ear canal or in the user's ear and which comprises at least one receiver, and a connection link between the behind-the-ear component and the external component, the connection link comprising at least two electrical contact lines. The connection link is reversibly connectable (for example pluggable) to the behind-the-ear component and/or the in-the-ear-canal component and has a length that is reversibly adjustable. The hearing instrument also comprises fixation means for reversibly fixing the adjusted length of the connection link.

"Reversible" in the context of this text means that a fixation may be released destruction free and preferably be re-fit a plurality of times.

Preferably, the external component is an in-the-ear-canal component. The in-the-ear-canal-component may be free of parts protruding from the ear canal and thus be a completely-in-the-canal component.

Due to the concept of the invention, the in-the-ear-canal component can be detached from the housing of the behind-the-ear component without the need to open the behind-the-ear component in a manner that sensitive electronics is exposed.

In a first embodiment of the invention, the connection link is formed by a connection element which on one end is pluggable to the external component and on the other end is fixedly connected with the behind-the-ear component and is insertable into a cavity of the behind-the-ear component to varying extents. In the present text, an optional "hook" is part of the behind-the-ear component. Of course, the mentioned cavity may also be present in the hook instead of a main part of the BTE component.

According to an alternative, preferred principle of the second aspect of the invention, a connection element for forming the connection link has one end with at least two electrical contacts which cooperate with corresponding electrical contacts of the behind-the-ear component or the external component so as to form a position variable contact. Position variable contacts in this text are contacts between two elements that can be brought in contact with each other in a range of relative positions or in plurality of discrete relative positions. An example of a position variable contact is a slider contact. However, also other kinds of position variable contacts may be envisaged. A first example of such on other kind of position variable contacts comprises threaded contacts, where a threaded shaft and its inside thread counterpart have at least a first and a second electrically conducting section forming the first and second electrical contacts and an electrically insulating section therebetween. A second example is based on electrical contacts that have a geometrical structure that allows them to be snapped on each other in a plurality of possible discrete positions. Such a geometrical structure may comprise at least one protrusion of one electrical contact co-operating with one of a plurality of corresponding indentations of the corresponding electrical contact. This first and second example feature the advantage that the contacting functionality may be combined with the fixation functionality.

The concept of the position variable contact has several advantages. For example, there is no need to deform a terminal proportion of a connection element in order to vary the length of the connection element, as is the case in the first embodiment, where the length of a connection element proportion in a given cavity is varied with a fixed end. Such deformations, given the dimensions present in a behind-the-ear component may cause substantial stress on the connection element and its electrical leads. In contrast, the concept of the position variable contacts allows the connection element to be relatively stiff, especially at a terminal portion carrying the electrical contacts. Also, a relatively large range of position variations is possible. Nevertheless, the first and second electrical contacts may be protected in their entire range by being placed in a cavity of the behind-the-ear component (or possibly the external component if the external component is large enough).

In embodiments of this preferred principle, the length of the connection link can be varied by inserting the connection element in the behind-the-ear component (or possibly the external component) to varying extents. The connection element can be fixed with regard to its longitudinal position (i.e. the extent of its introduction in the behind-the-ear component or the in-the-ear-canal component) and possibly also with regards to its angular position by the locking means. The locking means may be separate locking means or may, as previously mentioned, be a functionality of special embodiments of the position variable contact. The connection element may be fixedly connected to the other component, i.e. to the external (in-the-ear-canal or in-the-concha) component or the behind-the-ear component, respectively.

In most embodiments, due to the limited space in the in-the-ear-canal component, the position variable contact is formed between the connection element and the behind-the-ear component, whereas the connection element is fixedly connected to the in-the-ear-canal component.

A slider contact between first and second electrical contacts may be based on the following principle: The first electrical contacts have a surface with a certain extension in a longitudinal direction (the longitudinal direction—except for a possible bending—for example corresponding to the insertion direction of the connection element), whereas the second contacts exert a contact force on the first electrical contacts so that an electrical contact is made. As an alternative, the first contacts—comprising the surface that is extended in the longitudinal direction—may be spring contacts exerting the contact force.

Another principle is that the first and second contacts are both threaded. The at least two different first and second contacts or different polarities, respectively, are arranged with respect to each other at a distance in the longitudinal direction. Corresponding electrical contacts of different polarities are in this context for example contacts for "positive" and "negative" or for "signal" and "neutral", etc.; more than two "polarities" may be present.

The concept of preferred embodiments with a position variable contact may also be used in hearing instruments where the external receiver is arranged in a component to be placed in the concha instead of in the ear canal. Also in this case, the slider contact is preferably formed between the connection element and the behind-the-ear component, whereas the connection element is fixedly connected to the in-the-ear component.

Especially preferred embodiments are based on a combination of the first aspect of the invention with a second aspect of the invention. In this case an output of the receiver in the behind-the-ear-component could be acoustically coupled to the cavity in the BTE component, from where the sound couples into the bore of the sound conduction tube, which may be introduced into the cavity to varying extents. In embodiments where the cavity is present in the hook of the BTE component, the receiver may be mounted in the BTE component in a state-of-the-art manner.

In alternative embodiments, the external component comprises the sole receivers or all of a plurality of receivers of the hearing instruments.

The second aspect of the invention also concerns a method of adapting a hearing instrument, for example in accordance with the second aspect of the invention, to a user's atonomy. In this method, the hearing instrument comprises a behind-the-ear component and an external component for being placed in the user's ear or in the user's ear canal and which comprises at least one receiver, and a connection link between the behind-the-ear component and the in-the-ear-canal component, the connection link comprising at least two electrical contact lines, the connection link being reversibly connectable to the behind-the-ear component or the external component. The method comprises the steps of placing the behind-the-ear-component behind the user's ear, of placing the external component in the user's ear canal or the user's ear, of adjusting the length of the connection link until a comfort fit is achieved, and of applying a locking means to fix the length of the connection link.

It is a third object of the invention to provide a hearing instrument which comprises a component that is placed in the ear canal and fixation means for fixing said component in the ear canal, which fixation means overcome drawbacks of prior art fixation means and which especially provide a safe, pain free insertion and anchoring in the canal and removal therefrom. Preferred embodiments should especially be suited for anchoring deep in the ear canal, i.e. between the isthmus and the eardrum.

According to the third aspect of the invention, a hearing instrument with a fixation means separate from the in-the-ear-canal component is provided, which may be positioned in the ear canal and rest therein. The in-the-ear-canal component may be connected to the fixation means and detached therefrom when the same is already in the ear canal. This is in contrast to the prior art, where the in-the-ear-canal component has to be connected to the fixation means—such as an otoplastic or a flexible tip—before its insertion in the ear canal and may only be removed from the ear canal together with the fixation means.

In order to achieve this, the fixation means may be designed so that a pulling force acting on the in-the-ear-canal component ultimately releases the in-the-ear-canal component from the fixation means but not the fixation means from the ear canal. In other words, in this embodiment the retention force against longitudinal displacement between the fixation means and the ear canal is larger than the retention force against longitudinal displacement between the in-the-ear-canal component and the fixation means.

Whereas insertion of an object in the outer part of the ear canal is—except for the risk to insert it too deeply—relatively uncritical, the insertion of an object such that it protrudes beyond the isthmus is delicate for the following reasons: Firstly, the isthmus and the associated bending of the ear canal provides a natural bottle-neck for the insertion of objects which is delicate to pass. Secondly, as soon as the isthmus is passed, so is a natural protection of the tympanic membrane and the middle ear and one has to be very careful not to touch the tympanic membrane. Thirdly, the skin beyond the isthmus essentially directly covers human bone and is very algesic.

The concept according to the third aspect of the invention allows to have a hearing professional insert the fixation means and to nevertheless enable the user to insert and remove the in-the-ear component without pain and without any danger to damage delicate tissue. The fixation means may remain in the ear canal for several days to several months or more, whereas the hearing device component (being for example a completely-in-the-canal hearing instrument or an external receiver component co-operating with a behind-the-ear component) may be inserted and removed frequently.

This concept, therefore, makes possible a separation of the functions for fixation (and possibly also acoustic seal) on one hand and for supplying sound signals to the tympanic membrane on the other hand. The proposed assembly, therefore, comprises two constituents: a fixation means as a first constituent is designed for long-term wear and serves as a kind of 'scaffold' to hold the in-the-ear-canal component in place, and the other constituent is the in-the-ear-canal component itself, which can be inserted and removed.

Further, the placement of the in-the-ear-canal component does not depend on deep impressions, i.e. the overall assembly provides a fixation means that is independent of the individual ear canal geometry and which holds the in-the-ear-canal component in place.

Nevertheless, if the fixation means is not placed deeply in the ear canal, the user himself may be able to place it independently.

The fixation means may be self-expandable and hence adapt to the ear canal geometry. The pressure against the skin may be minimized. For example, the fixation means may be formed such that the pressure against the skin does not exceed 0.05 N/mm2. The fixation means is formed such as to hold the in-the-ear-canal component longitudinally, i.e. along the axis of the ear canal, in place.

According to preferred embodiments, the fixation means comprises a self-expandable tubular element. This element may, according to a first embodiment, be a hollow, reversibly compressible tube, such as a foam tube, which is made of biocompatible material and has a length of for example (for grown-up users) between 15 mm and 20 mm. The inner cross-section of the tube is at least in a main part smaller than an outer diameter of the in-the-ear-canal component.

According to a second embodiment, the fixation means comprises a self-expanding stent-like tube. Such a tube may have a tube wall with a wall diameter that is only a fraction of the ear canal diameter, for example at most ⅒ or at most 1/20 of the ear canal diameter. The tube wall may have a mesh-like structure and be made of metallic material. The fixation means according to the second embodiment further comprises holding elements extending from the tube wall inwardly. The holding elements are elastically deformable by insertion of the in-the-ear-canal component. The holding elements may be hair like and may for example be essentially perpendicular to the tube wall and thus project from the tube wall towards the tube axis.

The second embodiment allows placing an in-the-ear-canal component deeply in the ear canal with minimal interference with the physiological environment. Also, introduction of the fixation means is possible with a minimum of friction between the fixation element and the skin: The fixation means may be inserted compressed without touching the sensitive skin. Also, an ear mould does not have to be taken.

In both embodiments, the fixation means may moreover be such that a resistance against longitudinal displacement of the in-the-ear-canal component is larger than the axial pressure exerted on the ear canal skin by the fixation means. In the first embodiment, to this end the tube material may be such that the frictional forces are large (i.e. the coefficient of static friction between the fixation means and the ear canal wall is for example at least 1) and/or that shear forces encounter a comparably higher resistance than compression forces. In the second embodiment, the holding elements may comprise a non-linear force-displacement dependence for which an initial displacement, which is essentially in a longitudinal direction, encounters a higher resistance than displacements in a radial direction. As an alternative or in addition thereto, the holding elements may comprise barb like structures which enhance the resistance force against removal of the in-the-ear-canal component and thus for a given desired removal resistance allow to minimise the pressure against the skin. The barb like structures may be supplemented by corresponding structures of the in-the-ear-canal component. As yet another alternative or addition thereto, the holding means at the tube entrance may be stronger, i.e. provide for a larger retention force, than the holding means at positions where the in-the-ear-canal component is to rest. Stronger—possibly even obstructing—holding means at the tube end may also serve as an abutment for the longitudinal displacement of the in-the-ear-canal component. Such an abutment serves to prevent the user from introducing the in-the-ear-canal component too deep in the ear canal.

The full assembly in this second embodiment is characterised by a minimum of pressure against the skin and maximum ventilation of the occluded ear canal. Hence, the risk of fungal or bacterial infections is minimised. The fixation means itself may be made using a minimum of material so that the inner part of the ear canal including the canal walls and the tympanic membrane can be visually inspected by the hearing professional through the fixation means with the in-the-ear-canal component removed.

The fixation means in accordance with the second embodiment of the invention is placed beyond the isthmus and the second bend. To this end, a gauge tool may be used to guide the fixation means or parts of it into the ear canal to the desired location. The fixation means according to the second embodiment remains in the ear canal for several months until outward migration of the skin or other indications necessitate a replacement.

The second embodiment or variants thereof, next to the described advantages, is also advantageous from an acoustical point of view. Since a receiver may be placed beyond the isthmus and preferably as close as possible to the tympanic membrane, the high frequency response—which is often critical for hearing impaired persons—may be optimized.

The in-the-ear-canal-component may be any device or device part of a hearing instrument that is meant to be placed in the ear canal of the user. It may for example be a hearing instrument which as a whole is placed in the ear canal, i.e. a so-called in-the-canal or completely-in-the-canal hearing instrument. It may as an alternative be an external receiver assembly of a hearing instrument which also comprises an outside-the-ear-canal component, for example a behind-the-ear component or a component for being placed in the concha.

It may particularly be an in-the-ear-canal component of a hearing instrument according to the first or the second embodiment of the invention.

In set-ups where the in-the-ear-canal component is part of a hearing instrument also comprising outside-the-ear-canal-components, the third aspect of the invention has the following additional advantages:

Where the in-the-ear-canal component holds a receiver but not a microphone, a non-occluding fixation of the receiver—such as according to the second embodiment of the third aspect of the invention—may be combined with a comparably high amplification. This is because a large spatial separation of the microphone and the receiver precludes feedback problems.

For the outside-the-ear-canal component comprising for example the microphone, a signal processing unit and a battery compartment, conventional constituents as such known from behind-the-ear hearing instruments may be used. Only the in-the-ear-canal component, which is for example as small as possible in a non-occluding embodiment, has to be specifically designed.

The third aspect of the invention also comprises a method of fixing an in-the-ear-canal-component of a hearing instrument to a user' ear canal. Such a method comprises the steps of providing a fixation means adapted to fit in the user's ear canal and to be fixed therein, of placing said fixation means in the user's ear canal, and of connecting the in-the-ear-canal component to the fixation means placed in the ear canal. "Connect" does not mean that there has to be a positionally fixed mechanical connection such as a snap-in connection. Rather, "connect" merely defines that the in-the-ear-canal component after being inserted is held in place by the fixation means. The fixation means is inserted in the ear canal without the in-the-ear-canal component by a hearing professional or by somebody else, including the user himself. The connection of the in-the-ear-canal-component to the fixation means may for example routinely be done the user herself or himself.

It is a fourth object of the invention to provide a hearing instrument which comprises a component that is placed in the ear canal and fixation means for fixing said component in the ear canal, which fixation means overcome drawbacks of prior art fixation means and which especially provide a solution letting the ear canal open and has well-defined acoustic coupling characteristics, high comfort and secure fit. Preferred embodiments should especially be suited for in an outer portion of the ear canal, i.e. between the first bend and the isthmus. Further preferred embodiments should ensure a detachable connection between the in-the-ear-canal component and the fixation means.

According to the fourth aspect of the invention, a hearing instrument is provided which comprises an in-the-ear-canal component to be placed in a user's ear canal and fixation means for fixing it in the ear canal. The fixation means comprise an outer shell which is shaped to fit (i.e. custom shaped to fit the specific user's ear geometry) in the user's ear canal and a mounting structure for holding the in-the-ear-canal component. The mounting structure is such that the in-the-ear-canal component may have a unitary housing, and that the in-the-ear-canal component is replaceable. The set-up is an open set-up, so that a passage between the ear canal's interior and an outside is maintained. The passage is formed by a clearance between an inner surface of the outer shell and the mounting structure or the in-the-ear-canal component, respectively.

The shell's thickness is preferably not greater than 1 mm, for example not greater than 0.8 mm, the cross sectional area of the passage in a norm state (in which for example no external force is applied on the outer shell) is at least 3 mm2, preferably at least 4 mm2. The shell may be circumferential (i.e. form, in a section along at least one section plane, a closed contour) or partially circumferential (i.e. have, in section, an open contour).

The outer shell is preferably resilient, i.e. has an elasticity allowing temporal deformation.

The mounting structure which may be formed as an inner shell at least partially encasing the in-the-ear-canal component. The inner shell may adjoin the outer shell or may be held, by a support structure, at a distance therefrom, for example centrally within the outer shell.

The mounting structure also may comprise a snap-in locking mechanism for automatically locking the connection between the in-the-ear-canal component and the mounting structure when the in-the-ear-canal component is inserted in the ear canal component. The snap-in locking mechanism may be releasable, in a first variant, by a small tool or a fingernail when the in-the-ear-canal component with the fixation means is not in the ear canal. Alternatively, the locking mechanism may be a snap-in-twist-off mechanism where the in-the-ear-canal component may be removed by being twisted relative to the fixation means. Apart from the locking mechanism—which may be provided by a cantilever-like spring—the locking mechanism does not require any additional tools or parts such as screws, adhesives, etc.

The size of the passage is preferably large compared to vents of conventional ITE or CIC hearing instruments. For example, the minimum minimal cross section of said passage may be at least 3 mm2. It may for example be larger than a third of a cross section of the in-the-ear-canal component (taken in section along a plane perpendicular to a longitudinal axis of the ear canal). Since walls of both the outer shell and the inner shell (or other mounting structure) are preferably thin and resilient, the cross sectional area taken by the fixation means may be held generally small. Thus, if one manages to provide an in-the-ear-canal component with small dimensions, this advantage translates into better venting. This in turn is advantageous because the ear is in a condition close to the natural condition.

The fixation means is for example manufactured using the rapid prototyping technology which as such is known for manufacturing shells of ITE hearing devices or CIC hearing devices.

The fourth aspect of the invention combines advantages of both, the universal fit earpiece and custom shaped earpiece approaches. Since the object that is directly adjacent to the skin is a resilient shell, the fixation means is compressible and comfortable. Nevertheless, the custom shaped shell allows a perfect and reliable fit. The risk of walk-out is minimised. Further, in contrast to universal fit earpieces the shape of the fixation element when it is introduced in the ear canal is known, and so is the shape of the at least one passage. This makes possible that a programming software of the hearing instrument may calculate the acoustic coupling based on the exact geometry of the fixation element with the assembled in-the-ear-canal component and determine the settings of the hearing instrument based on the correct acoustic coupling values (and not just based on some mean value as in the universal fit earpieces). In an initial fitting process, the geometry data may for example be delivered electronically to the hearing professional, such that the programming software may use the data directly, or the geometry data may be delivered as an abstract code or as specific dimensional numbers which may be entered into the programming software by the hearing professional.

A method of fabricating a customised hearing instrument, therefore, comprises the steps of scanning the user's ear canal, or the user's ear impression manufacturing a fixation means with an outer shell shaped to fit in the user's ear canal and with a mounting structure mechanically coupled to the outer shell and being shaped to hold an in-the-ear-canal component of the hearing instrument, the fixation means being shaped so as to maintain a passage from an outside to an interior of the ear canal, determining, using data obtained from the scanning of the user's ear canal the in-the-ear-canal component position in the ear canal and the dimensions of the passage obtained therefrom, calculating, using the position and dimensions data, an individual amplification characteristics, programming a signal processing unit of the hearing instrument so as to have this amplification characteristics.

Of course, for the calculation of the individual amplification characteristics also further data such as data characterising the hearing loss of the user, are used.

The in-the-ear-canal-component may be any device or device part of a hearing instrument that is meant to be placed in the ear canal of the user. It may for example be a hearing instrument which as a whole is placed in the ear canal, i.e. a so-called in-the-canal or completely-in-the-canal hearing instrument. It may as an alternative be an external receiver assembly of a hearing instrument which also comprises an outside-the-ear-canal component, for example a behind-the-ear component or a component for being placed in the concha. It may particularly be an in-the-ear-canal component of a hearing instrument according to the first or the second embodiment of the invention.

Although hearing instruments according to the fourth aspect of the invention may be used in both, set-ups with an in-the-ear-canal component inserted deeply in the canal (beyond the isthmus) and with an in-the-ear-canal component in an outer portion of the canal, they are especially advantageous for hearing instruments placed in an outer, cartilaginous portion of the canal.

The term "hearing instrument" or "hearing device", as understood here, denotes on the one hand hearing aid devices that are therapeutic devices improving the hearing ability of individuals, primarily according to diagnostic results. Such hearing aid devices may be Outside-The-Ear hearing aid devices or In-The-Ear hearing aid devices. On the other hand, the term stands for devices which may improve the hearing of individuals with normal hearing e.g. in specific acoustical situations as in a very noisy environment or in concert halls, or which may even be used in context with remote communication or with audio listening, for instance as provided by headphones. In preferred embodiments of all aspects of the invention, however, the amplification of the active system is positive. (The active system comprises the input transducer (s), the signal processing means and the output transducer(s).) In other words, according to these preferred embodiments, the hearing instrument amplifies the incident sound in at least a part of the frequency spectrum and thus is suitable for serving as a hearing aid.

The hearing devices as addressed by the present invention are so-called active hearing devices which comprise at the input side at least one acoustical to electrical converter, called a microphone, at the output side at least one electrical to mechanical converter (receiver), and which further comprise a signal processing unit for processing signals according to the output signals of the acoustical to electrical converter and for generating output signals to the electrical input of the electrical to mechanical output converter. In general, the signal processing circuit may be an analog, digital or hybrid analog-digital circuit, and may be implemented with discrete electronic components, integrated circuits, or a combination of both.

BRIEF DESCRIPTION OF THE DRAWINGS

In the following, principles of the invention are explained by means of a description of preferred embodiments. The description refers to drawings with Figures that are all schematic. The figures show the following:

FIG. 41 a front view, side view and top view (all in section) of a fixation means of a hearing instrument according to the fourth embodiment of the invention.

FIG. 42 an illustration of a possible wall structure for the outer shell.

FIG. 43 in illustration of alternative embodiments of the fixation means.

FIG. 44 in illustration of another alternative embodiment of the fixation means.

FIG. 45 an illustration of yet another alternative embodiment of the fixation means.

FIG. 46 an illustration of a snap on/twist off mechanism for fastening and detaching an in-the-ear-canal component in the inner shell of the fixation means.

Same reference numerals in different figures refer to same or analogous elements.

DESCRIPTION OF THE PREFERRED EMBODIMENTS

Figure 1:
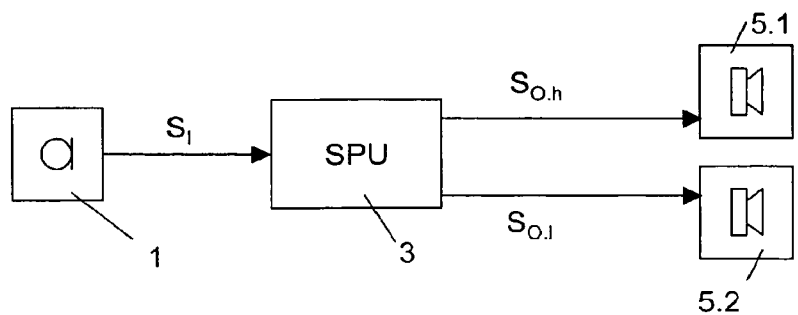
FIG. 1 a hearing aid system with two receivers.
Figure 2:
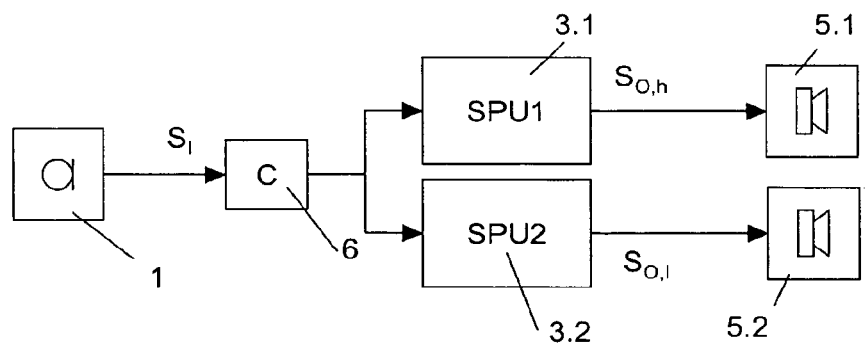
FIG. 2 a hearing aid system with two receivers and two digital signal processing elements.
Figure 3:
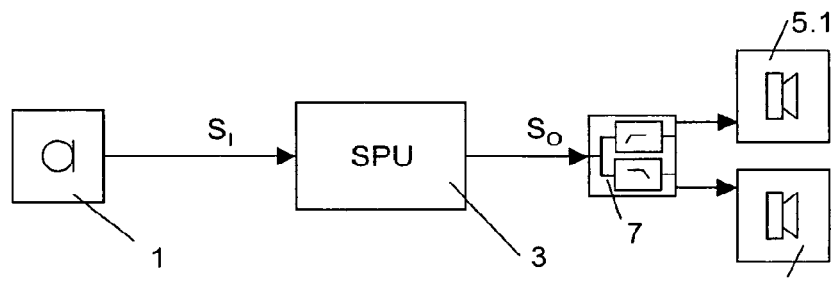
FIG. 3 a hearing aid system with two receivers and a frequency separating filter.

FIGS. 1-3 show examples of hearing aid systems with more than one output electric-to-acoustic converter 5.1, 5.2, which converters in the following are named 'receivers'. The two receivers 5.1, 5.2 in the hearing aid systems shown in FIGS. 1-3 differ from each other in that they have different frequency responses. For example, the first receiver may have smaller dimensions and provide an optimal response to high frequency signals, such as to signals above a particular frequency depending on the application. This frequency may be 500 Hz, 1000 Hz, 2000 Hz, another value between 500 Hz and 2000 Hz or a lower or higher value. The second receiver may be larger and be optimized for signals of lower frequencies, such as signals below the particular frequency.

The shown examples may be implemented according to the first aspect of the invention, potentially in combination with the second aspect and/or one of the third and of the fourth aspect of the invention.

A hearing aid system with a single microphone and two receivers is schematically illustrated in FIG. 1. The system comprises, in a sequence, a input acoustic-to-electric converter (microphone) 1, producing an input signal Si, a signal processing unit (SPU) 3, transforming the input signal into two output signals, namely a first output signal So,h, with predominating high frequency signal proportions, and a second output signal So,l with predominant low frequency signal proportions, and the receivers 5.1, 5.2. The signal processing unit may implement the function of an analog-to-digital converter and an digital signal processing stage. It may, depending on the requirements of the receivers, further comprise one or more digital-to-analog transforming stage(s). Such a digital-to-analog transforming stage, however, is not always required, since hearing aid receivers in digital hearing instruments are often driven by a pulse width modulated (PWM) or a pulse code modulated (PCM) digital signal instead of an analog signal.

Elements of the signal processing unit SPU may be implemented in a single signal processor or may comprise a plurality of physically separate, appropriately connected elements.

The signal processing unit in all embodiments of the first aspect of the invention preferably includes an amplification functionality. This means that the amplification of the signal processing unit is positive. In other words, the signal strength of the added analog signals fed to the receivers is larger than the signal strength of the analog input signal produced by the input converter(s). However, the first aspect of the invention is also suitable for hearing instruments which do not require a positive amplification, such as active hearing protection devices, for which the signal processing unit provides a negative amplification (damping).

The digital signal processing stage 3 separates high frequency and low frequency components of the input signal according to the characteristics of the two receivers 5.1, 5.2. Splitting of a signal into high and low frequency signals on a signal processor level as such is known in the art and has been developed and used for audio systems. An example of according audio signal management methods can be found in U.S. Pat. No. 6,349,285, which is incorporated herein by reference.

In the shown embodiments, the hearing aid comprises a single microphone. However, there could also be several microphones and/or other input devices—such as a telecoil—, together with according analog-to-digital converting means. For example, dual microphone hearing aids are known which may include a beamforming functionality.

Also, although in all described embodiments the hearing aid has two receivers, more than two receivers may in fact be used in a hearing aid, for example each receiver for a certain frequency range, or a single receiver for low frequency sounds in combination with a multitude of high frequency receivers, etc.

The embodiment of FIG. 2 differs from the embodiment of FIG. 1 in that it comprises two signal processing stages 3.1, 3.1, one for the high frequency channel (i.e. for providing an input signal for the first receiver 5.1), the other one for the low frequency channel. A control element 6 provides a synchronized input for both digital signal processing stages. The control element may for example either simply split the signal into two (equal) outputs which are fed into the signal processing unit which then overtakes the task of digitally filtering an processing the filtered signal. (In this embodiment, the control element may merely be considered to be a branching of a wiring). Or, the control element itself may comprise a filter element which could preferably be analog if the (for example conventional) SPUs already have a A/D converter implemented. Alternatively, the control element may comprise a digital filter if the SPU possesses a digital input. In this case, an analog-to-digital converter (not shown) will be interposed between the microphone 1 and the control element 6.

The principle advantage of having to use more than one SPU is that SPUs of conventional single receiver hearing aids may be used. To this end, merely the amplification characteristics of the digital signal processing stages has to be set differently: whereas the first signal processing stage 3.1 amplifies high frequency sounds and attenuates low frequency sounds, the second signal processing stage has an opposite characteristics.

Yet another embodiment is depicted in FIG. 3. This embodiment differs from the embodiment of FIG. 1 in that the digital signal processing stage only comprises a single output for output signal SO. The digital signal processing stage may therefore be a processing stage as such known from conventional hearing aids. Frequency splitting is attained, for example, by an analog frequency-separating filter 7 arranged downstream of the —single—digital-to-analog converter 4. The two outputs of the frequency-separating filter are fed to the two receivers 5.1, 5.2.

As yet another alternative (not shown in the figures) the signal processing unit may produce only one signal which signal is fed to both receivers. This alternative is suitable for receivers the characteristics of which is that sounds of low or high frequencies, respectively, are practically suppressed, so that the receivers themselves serve as high pass and low pass filters, respectively.

Figure 4:
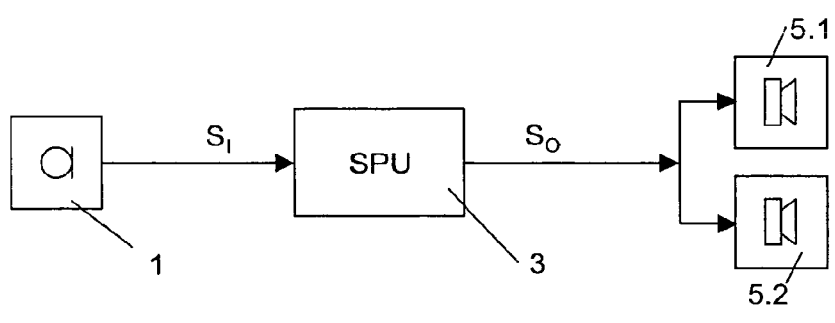
FIG. 4 a further hearing aid system with two receivers.

In FIG. 4, an embodiment is shown where no filter is used at all. In that case the single output of the SPU 3 (with digital or analog signals) is fed into the two receivers 5.1, 5.2 which have by design different response characteristics such one receiver predominantly outputs sound at low frequencies and the other outputs sound at high frequencies.

Figure 5:
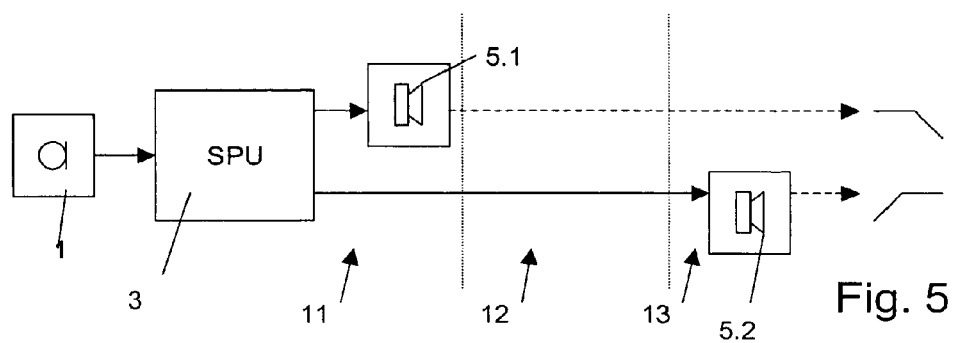
FIG. 5 a schematic representation of a hearing aid with two receivers, one of which is placed in the ear canal.
Figure 6:
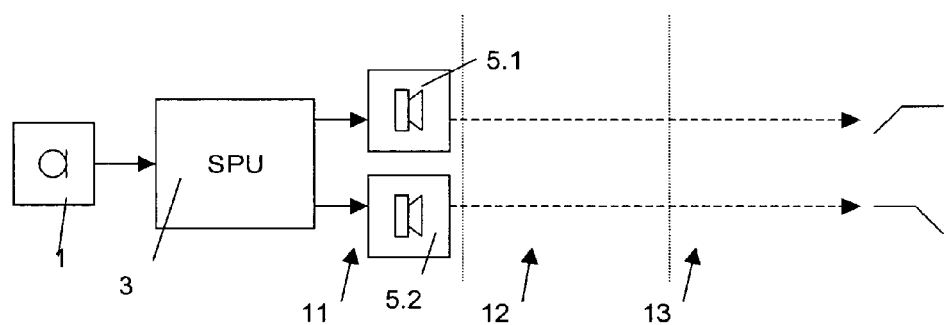
FIG. 6 a schematic representation of a hearing aid with two receivers, where both are placed outside the ear canal.

Embodiments of the first aspect of the invention are illustrated in FIGS. 5 and 6. There, dotted lines separate an outside-the-canal—(preferably behind-the-ear)—component 11, an intermediate signal transmission region 12 and an in-the ear (namely in the canal) region 13. The reference numerals 1, 3, 5.1, and 5.2 denote the microphone, the signal processing unit (comprising digital signal processing stage together with the analog-to-digital converters, the digital-to-analog converters and potential other digital or analog signal processing means arranged between the input converter(s) and the receivers), and the first and second receiver, respectively.

The first, especially preferred embodiment of the first aspect of the invention is shown in FIG. 5. The first receiver 5.1 is arranged in the outside-the-canal component 11, whereas the second receiver 5.2 is placed in the ear. The signal transmission between the outside-the-canal component and the in-the-canal component is provided by an (airborne) sound transmission channel 15 from the first receiver 5.1 to the ear canal, and by an electric signal transmission channel 16 from the signal processing unit 14 to the second receiver, respectively.

According to the embodiment of FIG. 6, both receivers are placed in the outside-the-canal component. Two sound transmission channels 17 lead from the receivers 5.1, 5.2 to the ear canal.

Figure 7:
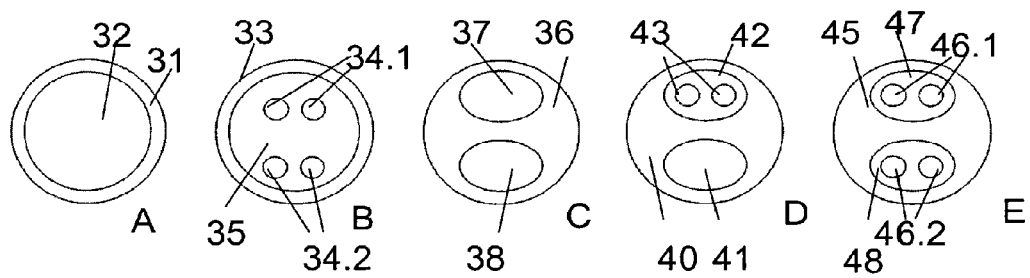
FIG. 7 cross sections of connection elements between an outside-the-ear-canal (for example behind-the-ear BTE) component and an in-the-canal component.

The two channels in the embodiment of FIG. 6 need not be physically separated as is illustrated in panel A of FIG. 7. FIG. 7 shows cross sections of different connection elements between an out-of-the-canal (for example in-the-ear) component and an in-the-canal component of the hearing aid. The connection element of panel A is a sound conduction tube 31 comprising only one bore 32 which is connected, on one side with the outputs of both receivers and on the other side ends in the ear canal. The sound conduction tube 31, thus carries both channels.

Also the connection element of panel C is suited for the embodiment with both receivers placed outside the ear canal. The sound conduction tube 36 comprises two bores 37, 38 serving as sound conduction bores for the output of the first, and the second receiver, respectively. The bores need not have the same dimensions as in the figure but may rather be adapted so that their resonance frequencies are adapted to the frequency of the signals they conduct. For example, each bore may contain dedicated conventional passive acoustic filters.

The two bores of the sound conduction tube 40 of panel D, in contrast have different purposes. Whereas the first bore 41 is a sound conduction bore, the second bore 42 contains an electrical wire pair 43 for electrically contacting a receiver placed in the ear canal. The receiver in the ear canal may be placed in a otoplastic which itself has a sound conduction bore that passes the receiver such that the sound outlet of the in-the ear canal receiver is next to the sound outlet from the sound conduction bore, which is coupled to the sound conduction tube and eventually to the receiver in the BTE component. Both sound outlets point inwards to the eardrum.

The sound conduction tube of panel D, therefore, is suited for the embodiment with one receiver placed in the canal, and another one placed outside the canal. In contrast to the shown embodiments, the electrical wire pair could also be placed inside a (single) sound conduction bore.

Panels B and E both show cross sections of connection elements comprising a tube 33; 45 with two electrical wire pairs 34.1, 34.2; 46.1, 46.2 for electrically contacting two receivers placed in the ear. In panel B, both wire pairs are placed in a single bore 35, whereas in panel E the tube contains two bores 47, 48 each comprising a wire pair. Other set-ups, for example with wires encapsulated in tube material may be envisaged. Configurations with more than one receiver in the canal are described further below.

Figure 8:
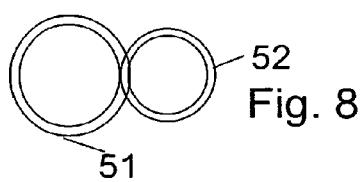
FIG. 8 a cross section of a further connection element.

The sound conduction element of FIG. 8 is made up of two sound conduction tubes 51, 52 mechanically coupled to each other. The tubes have different sizes and may also have different wall thicknesses and/or be made of different materials having different elasticities. The tube 51 with the larger diameter is preferably used for conducting the low frequency sound signals.

Figure 9:
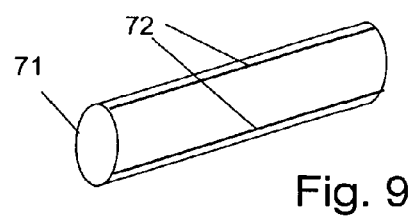
FIG. 9 a sketch of an approach of mechanically coupling a sound conduction tube with an electric connection.

In the embodiment of FIG. 9 the electrical wires 72 are also coupled to the sound conduction tube 71 in an essentially straight manner. Other ways of coupling the wires to a sound conduction tube may be envisaged.

The above described embodiment of combined sound conduction and electrical signal conduction elements may be coupled to the outside-the-ear (for example behind-the-ear-) component by means of a snap-on mechanism (electrical contacts may be arranged on the inside or the outside of a tube surface), by means of a nipple, using a fastening nut or similar.

Whereas a mechanical coupling of potentially required wires to sound conduction tubes is advantageous, it is not necessary. Embodiments where electrical wires are guided independently of the sound conduction tube(s) may be envisaged, too.

FIGS. 6-9 relate to the example of two receivers, but the concepts of the shown embodiments may readily be extended to more than two, for example by coupling the outputs of more than one (or more than two) receivers to one sound conducting bores, by providing more bores than shown in the figure, by providing more electrically conducting wires than shown, etc.

Figure 10:
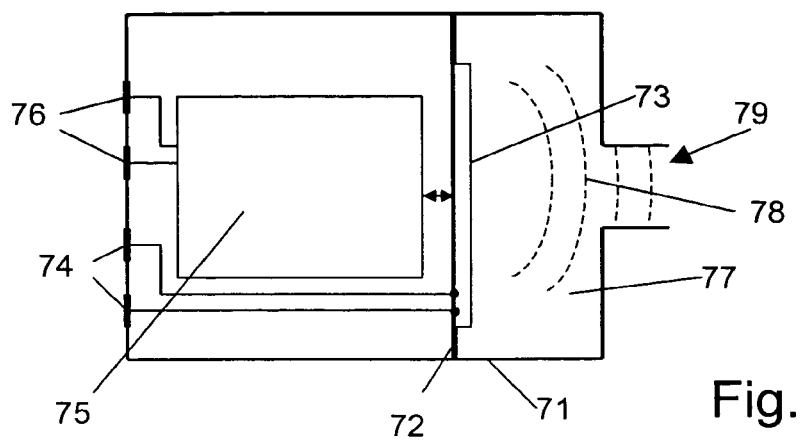
FIG. 10 a schematic representation of an assembly of two receivers in a single housing.
Figure 11:
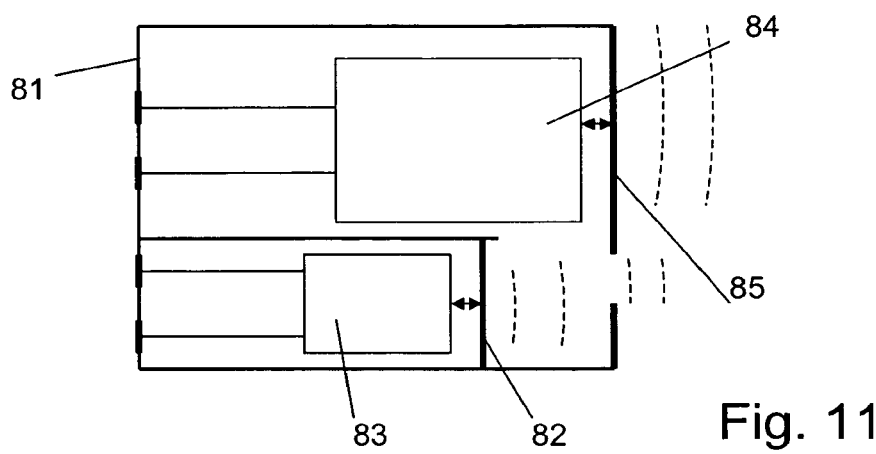
FIG. 11 a schematic representation of an alternative assembly comprising two receivers in a single housing.

FIGS. 10 and 11 show—in a very schematical manner—concepts of a combination of two receivers in a single housing. Such concepts may be useful for embodiments of the first aspect of the invention comprising more than two receivers, two of which are placed in the ear canal. They may also be used in situations where two receivers are placed outside the ear canal—for example behind the ear or in the concha—and where it is important to save space. They may, as yet another alternative, be used in hearing aids deviating from the first aspect of the invention, where all of at least two receivers are placed in the ear canal.

A two-receiver device of the kind described in FIG. 10 comprises the following features:

A housing 71 comprising a diaphragm 72, which may, actuated by an electromagnetic inductive or capacitive drive mechanism, be caused to vibrate and thus generate a first contribution to a sound output.

A piezoelectric element 73 or a MEMS (Micro-Electro-Mechanical System) element placed within the housing and being operable to vibrate excited by an electrical signal and thus to generate a second contribution to a sound output.

The embodiment of FIG. 10 is, in other words, characterised in that a low frequency sound producing element (such as the diaphragm) and a high frequency sound producing element (such as a piezoelectric element) are both in the same housing such that their sound producing surfaces are adjacent a common gas filled free volume within the housing.

In the shown, preferred embodiment, the piezoelectric element 73 is mechanically coupled to the diaphragm 72. More concretely, it is placed on the diaphragm. It is caused to vibrate if an according electrical voltage signal is applied to the high frequency signal contacts 74. The diaphragm's drive mechanism includes for example conventional exciting means 75 such as a coil co-operating with a permanent magnet placed on a tuning fork like armature and means—such as a drive rod—for transferring vibrations from the armature to the diaphragm. The low frequency signal contacts are denoted by 76 in the figure.

The diaphragm and the piezoelectric element placed thereon both excite sound waves 78 in the gas (typically air) in the free volume 77 of the housing. The sound waves are guided through the opening 79, possibly to a sound conducting tube coupled to it.

The device of FIG. 10 may be varied in that the piezoelectric element need not be coupled to the diaphragm but may be coupled to the housing and be placed somewhere else adjacent the free volume 77 of the housing (which free volume, of course, may be shaped differently from the shown embodiment).

The device of FIG. 10 may be used both, as a double receiver placed in the ear canal or as a double receiver placed in an element outside the ear canal to which a sound conduction tube is coupled.

The two-receiver device of FIG. 11 is also suitable for being placed in the ear canal or outside the ear canal, but it is a preferred embodiment for applications where it is place in the canal. It comprises:

A housing 81 with a sound producing element placed therein. The sound producing element is suited for producing high frequency sounds and may be a diaphragm 82 with a corresponding inductive or capacitive first drive mechanism 83 or may be a piezoelectric element.

A second capacitive or inductive drive mechanism 84 operable to cause a part of the housing to vibrate.

The part of the housing that may vibrate may be a flexible membrane 85 which forms a part of the housing. In the shown embodiment, the flexible membrane forms an end face of the housing. The end face, if the device is placed in the canal, faces inward, i.e. towards the eardrum. Alternatively, this part may be an outer shell, a combination of an outer shell and an end face, or even the entire housing.

In the shown embodiment, the membrane 85 comprises a membrane opening for the high frequency sounds caused by the high frequency sound producing element.

Figure 12:
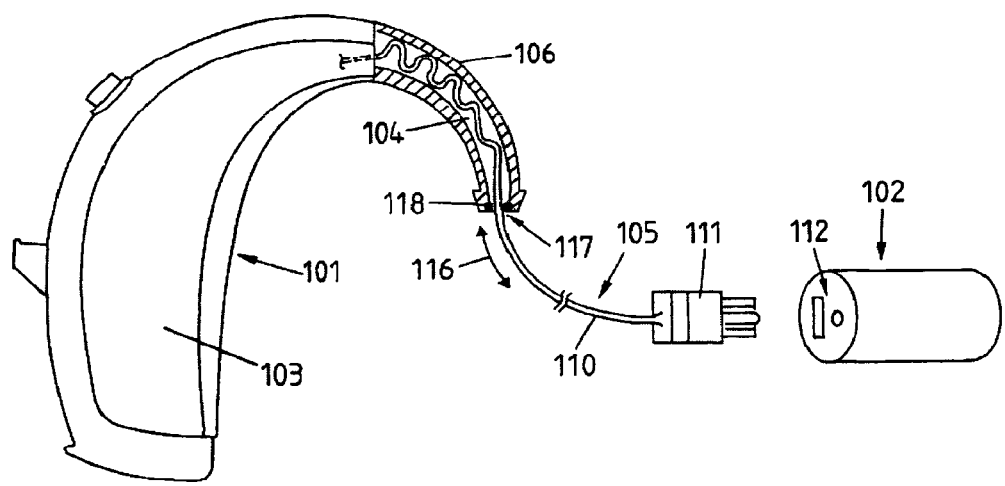
FIG. 12 an embodiment of the second aspect of the invention.

In FIG. 12, an embodiment of the second aspect of the invention is very schematically drawn. The hearing instrument shown in FIG. 12 comprises a behind-the-ear component 101 and an in-the-ear-canal component 102. The behind-the-ear component comprises sound acquiring and processing means 103 and a cavity 104 formed in a hook 106 of the behind-the-ear component. The sound acquiring and processing means 103 are connected with the in-the-ear-canal component 102 by means of a pluggable connection link 105. The connection link is implemented by means of a connection element, namely a cable 110 comprising two wires and a plug connector pluggable into a corresponding connector of the in-the-ear-canal component 102. In the figure, very schematically a male plug 111 of the connection element is shown which co-operates with a corresponding female socket 112 of the in-the-ear-canal component 102; however any reversibly pluggable connector could be used. Often, a connector will comprise guiding means for supporting a smooth plugging operation.

The connection link is adjustable in its length in that the connection element may be inserted in the cavity through an orifice 117 to a variable extent, as indicated by the arrow 116. Sealing means 118 allowing a smooth sliding of the cable with respect to the orifice are also shown in the figure. In contrast to the shown configuration, the cable in the sliding operation may be guided by a tube instead of just an orifice. It may in yet another configuration by inserted in an inner tube which is slidable inside an outer tube.

In practice, the behind-the-ear component will often comprise a so-called 'hook', which is a dimensionally stable element hooking the behind-the-ear component behind the ear and guiding the connection element towards an interior of the user's concha. In such embodiments the cavity will often be in a transition region between the hook and the sound acquiring and processing means.

The in-the-ear-canal component is arranged in fixation means (not shown) holding it in its place in the ear canal. Such fixation means may be an otoplastic or a self-adjusting fixation means as such known in the art. It may also be a newly developed fixation means, such as a fixation means according to the third or fourth aspect of the invention as described further below.

Figure 13:
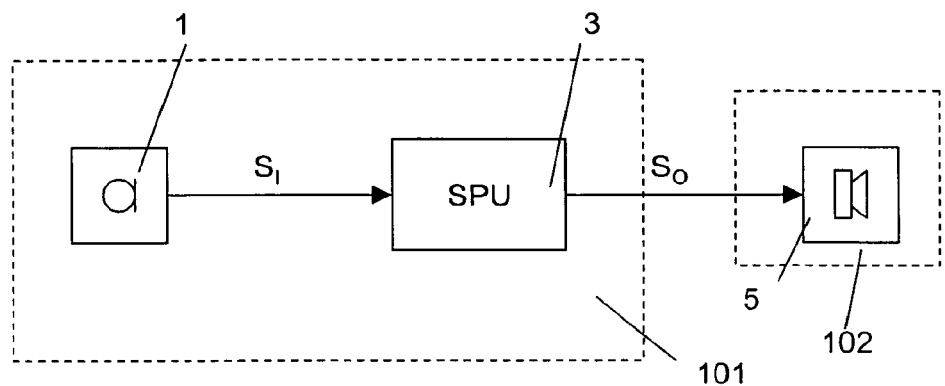
FIG. 13 a block diagram of a hearing aid device according to the second aspect of the invention.

FIG. 13 illustrates a hearing aid system that may be implemented according to the second aspect of the invention. The sound acquiring and processing means comprise a microphone 1 (usually comprising pre-amplifier means), the signal processing unit 3 arranged in the behind-the-ear component 101. The receiver 5, however, is placed external component 102, which is for example an in-the-ear-canal-component.

The behind-the-ear component 102 for example also comprises a compartment for a battery (not shown) for the active elements of the sound acquiring and processing means. The external component is preferably free of any battery means and is only fed by the signal transmission line formed by the connection link.

The signal transmission between the BTE component and the ITE (including ITC or CIC) component could also be wireless. In that case, the ITE (ITC, CIC) component would require also a battery and the signal processing unit to receive the signal and the drive the receiver.

Of course, as an alternative to the system illustrated in FIG. 13, a system according to the first aspect and comprising at least one receiver to be placed in the ear canal or another set-up including a signal transmission line between a behind-the-ear component and an in-the-ear-canal component may be used.

In the following, preferred embodiments of the second aspect of the invention are described, which follow the principle that a position variable contact is formed between the connection element and one of the two components to be connected, preferably between the connection element and the behind-the-ear component.

Figure 14:
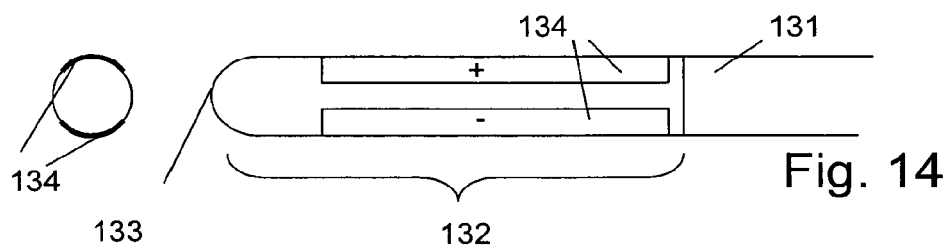
FIG. 14 a schematic representation of the end of a connection element to be inserted in a BTE component (left: front view, right: side view).

In a preferred embodiment, the connection element 131 is made in a main part of a flexible material such as PEBAX and contains two wires connected to the receiver placed in the external component at one end. The opposite end, shown in FIG. 14, is the end which is going to be inserted into the behind-the-ear component. It has a contact support part 132, which is made of an insulating material that is preferentially more rigid than the flexible material of the connection link main part. The left panel of FIG. 14 shows a front view of the connection element from the contact support part side. A tip 133 of the contact support part is tapered such as to facilitate the insertion into the duct of the Behind-the-ear (BTE) component. Two electrical contacts 134 are mounted on the contact support part 132 such to enable electrical contact in opposite radial directions of the contact support part. The contacts are in electrical contact with the wires that are connected to the receiver. The electrical contacts 134 are preferentially rigid and do not produce a contact force in radial direction. The contacts are arranged to provide left-right symmetry, meaning that one pole is on the top and the other pole on the bottom of the contact supporting part, or one pole is on the left and the other on the right. This allows either inserting a connection link for a left ear or for a right ear. (For the purpose of the description of this and the following embodiments it is assumed that the receiver is operated in a symmetric mode, i.e. plus and minus poles are labelled simply for easy distinction of the two poles. Of course, the concepts described herein are also suited for non-symmetric modes).

Figure 15:
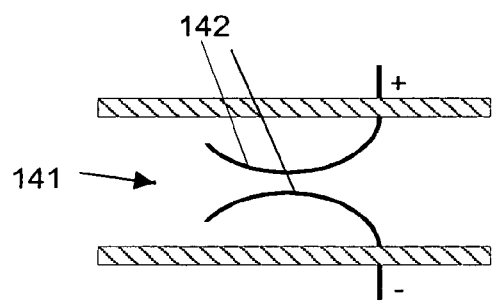
FIG. 15 a cross section of a cavity within the BTE component for receiving the end of a connection element.
Figure 16:
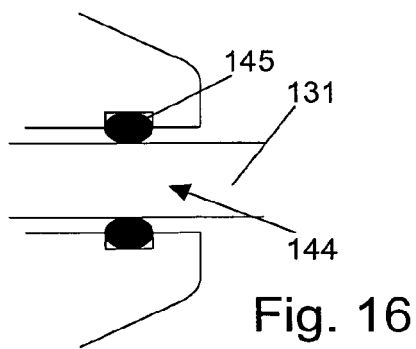
FIG. 16 a cross section of a duct of a BTE component with a sealing O-ring.

In this preferred embodiment, the BTE component housing has a cavity 141 with an inner cross sectional dimension large enough to hold the contact support part and partially also the connection link (see FIG. 15). The length of the cavity is at such as to allow moving the connection link (with the contact support part) by a sufficiently large amount required by fitting the BTE component with the external receiver to the ear geometry of a user. The cavity has two spring electrical contacts 142 which, when the connection link is inserted into the BTE component housing, are making contact with the electrical contacts on the contact support part of the connection link and which are producing a sufficiently large contact force to provide a reliable electrical connection. Preferably, the contact force is also large enough to provisionally fix the relative position of the connection element and the behind-the-ear component to enable the hearing professional to verify the physical fitting of the hearing device without the need of fixing the position by means of the locking mechanism. To protect the inside of the behind-the-ear component housing from moisture, the orifice or duct 145 of the BTE component housing in which the connection link is inserted may be equipped with a sealing means such as an O-ring 145 (see FIG. 16).

In this preferred embodiment, the fixation of the connection link within the BTE component housing requires a separate fixation means. One possibility is to provide a (metallic) set screw 147 with a conical end 147.1 which penetrates into the softer flexible material of the connection link 131 such as to fix the connection link in longitudinal and angular direction (see FIG. 17). A set screw is for example arranged in the duct of the behind-the-ear component, thus for example on the left of the O-ring in FIG. 16 or in the hook. Other fixation means can be applied alternatively; one example is clamping with a fastening nut.

Figure 18:
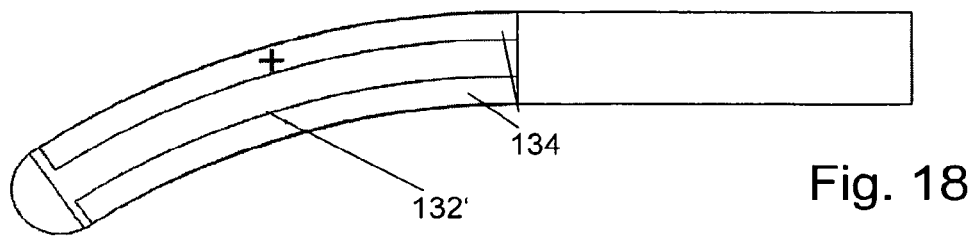
FIG. 18 a contact support part of a connection element with a curvature of constant radius.

In an alternative embodiment, the contact support part 132' has a defined curvature with constant radius in its longitudinal direction (see FIG. 18). In this way, the cavity within the BTE component and also the duct of the BTE component into which the connection link is inserted, also has a defined curvature with constant radius, approximating the anatomical shape behind the ear just at the location where the BTE component is usually suspended. By doing so, the size of the BTE component can be minimized.

Figure 19:
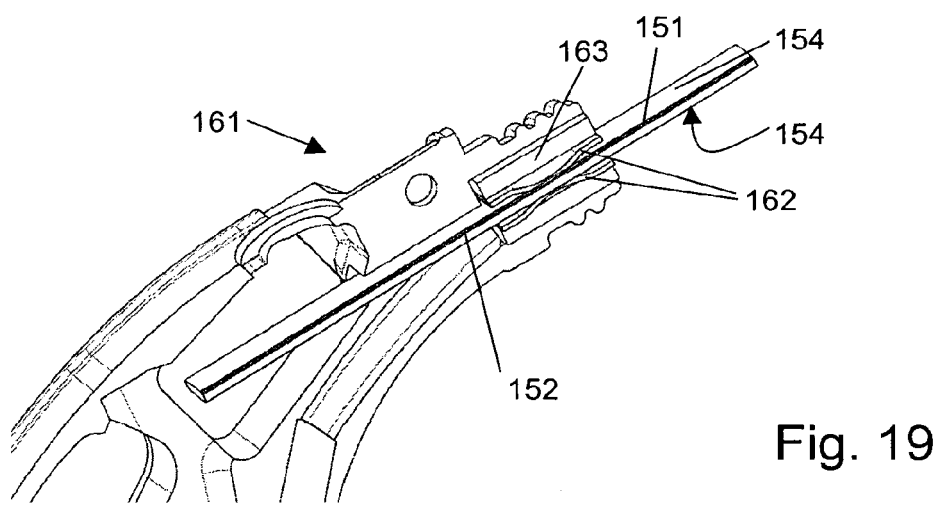
FIG. 19 a sliding contact assembly.

In a further alternative embodiment, the contact support part has a cross-sectional shape which deviates from cylindrical symmetry and thus defines the angular position of the contact support part and the whole connection element with respect to the BTE component housing. An example of such an assembly is shown in FIG. 19. FIG. 19 shows an end portion 161 of a BTE component with an inserted contact support part 152 of a connection element 151. In the shown embodiment, the contact support part 152 is essentially plate shaped and for example similar to a flexible print with contacts 154 on the top and the bottom. The corresponding contacts 162 belonging to the BTE component in the drawn embodiment are mounted within a sleeve 163 that is inserted into the duct of the BTE component housing. Also shown in the drawing is a (conventional) hook mounting structure 164 with several nipples. A feature of this kind could also be used as thread to co-operate with a fasting nut in embodiments of the invention.

Figure 20:
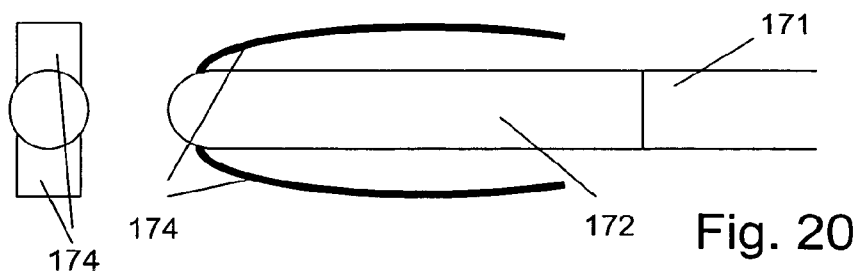
FIG. 20 a variant of a contact support part of a connection element.
Figure 21:
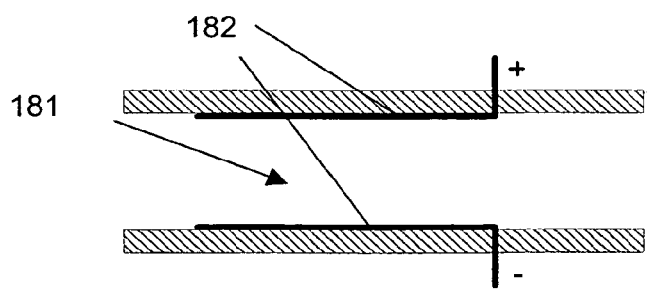
FIG. 21 a BTE component cavity for co-operating with the connection element of FIG. 20.

A further embodiment of the second aspect of the invention and including a slider contact is shown in FIGS. 20 and 21. FIG. 20 shows an end portion of the connection element 171 including the contact support part 172 in front view (right panel) and in side view (left panel). The electrical contacts 174 fixed on the contact support have the shape of a resilient slab or wire and part are made of highly resilient material such as copper beryllium and are formed such that they are squeezed radially when then the connection link is inserted into the BTE component housing. Within the cavity 181 of the BTE component housing, rigid contact pads 182 as shown in FIG. 21 are mounted which establish the electrical connection over the longitudinal range required by the application.

Figure 17:
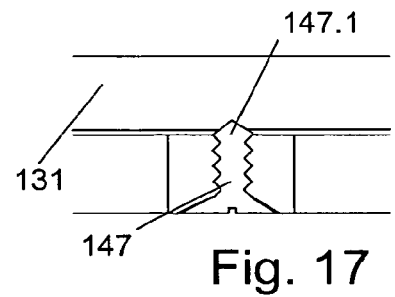
FIG. 17 a set screw placed in the BTE component housing or a (mini) hook.

As alternatives to the fixation described referring to FIG. 17, other types of fixation means may be used. In an alternative embodiment the BTE component housing can partially be opened by removing a cover. By doing so, the cavity which eventually holds the connection link with the electrical contacts is accessible. Within the cavity, the two contact pads are mounted. Preferably, the cavity is separated from the remaining inner portions of the BTE component housing by walls, so that the electronics is well protected during manipulation and length adjustment in the cavity. The contacts are fed through the walls of that cavity and are connected to the electronics with the remaining inner portion of the BTE component housing.

Figure 22:
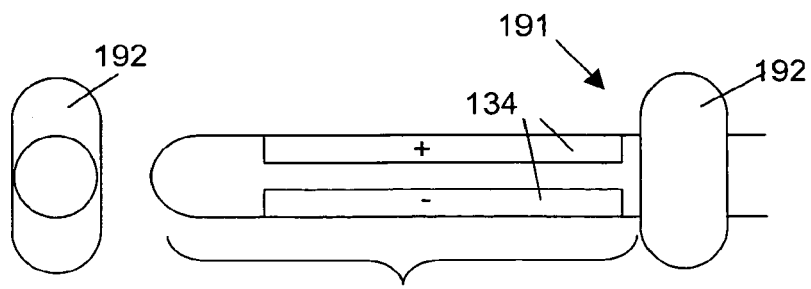
FIG. 22 a schematic representation of a connection element comprising structures for an interlocking mechanism.
Figure 23:
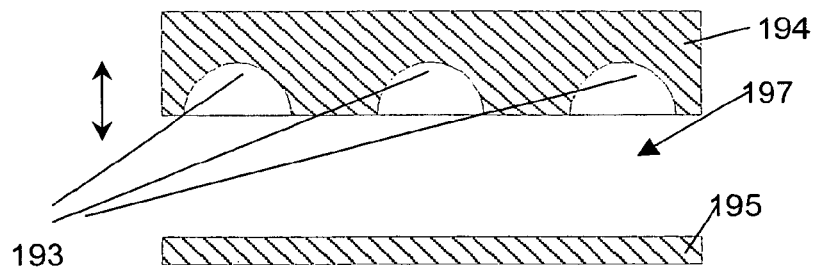
FIG. 23 a counterpart for the connection element of FIG. 22.
Figure 24:
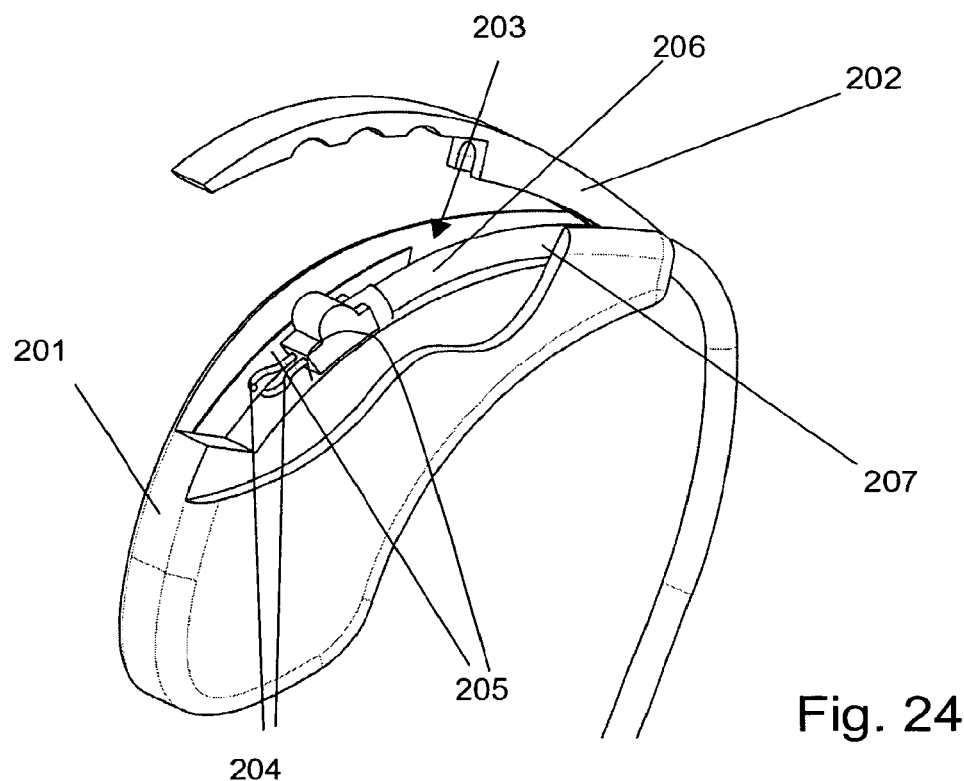
FIG. 24 a view of an interlocking set-up of a BTE component and a connection link.

An example of such an alternative fixation is shown in FIGS. 22-24. In this alternative embodiment, the connection element 191 is equipped with a radially extending interlocking structure 192 near the electrical contacts. An example of such a (in the drawing: male) interlocking structure is shown in, which depicts a contact support portion 132 of a further connection element. As shown in FIG. 23, the cavity 197 of the BTE component housing holding the connection link has a given number of matching (in the drawing: female) interlocking structures 193, longitudinally spaced apart such as to offer the possibility to chose from a number of different lengths between the BTE component and the receiver component. The hearing professional will then place the connection link into the cavity at the desired position and will then close the cavity by moving a cavity locking element with respect to the rest of the BTE component housing. In the shown embodiment, the matching interlocking structures 193 of the BTE component housing are formed in a locking element 194 which is movable—for example pivotable—with respect to a fixed part 195 of the housing and which is lockable by closing the cover (not shown in FIG. 23).

FIG. 24 shows a conceptual view of a BTE component, where such an alternative fixation is realised by providing the (female) interlocking structure as described above directly in the cover 202. The cavity 203 in this embodiment extends over a long proportion of a rear of the BTE component and is separated from the rest by for example moisture proof cavity walls. The embodiment of FIG. 24 also shows electric contacts 204 formed somewhat differently from the previously described embodiments. The electric contacts 204 have a tentacle-like shape and are, like the embodiment of FIG. 20, pre-stressed to press against corresponding electrical contacts 205 of the BTE component housing. The flexible part of the connection element 206 is denoted by 207 in the figure.

Other interlocking means are possible, on of them is a bolt which is inserted into the BTE component to fix the connection link position. The bolt locks the interlocking means on the connection link.

Figure 25:
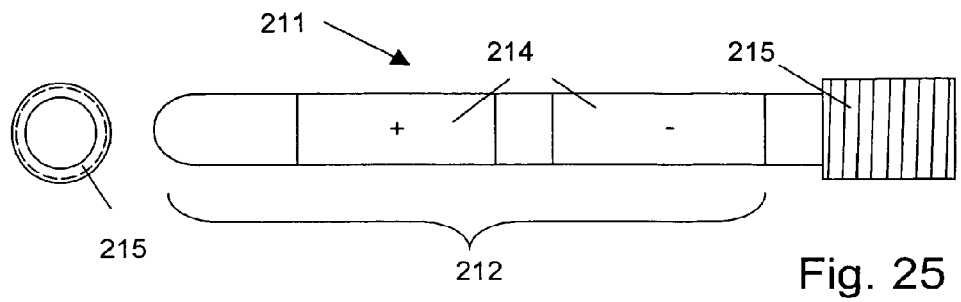
FIG. 25 a schematic representation of a contact support part of a connection element with slider contacts and a threaded sleeve.

A different embodiment foresees the length adjustment by means of a thread mechanism (see FIG. 25). The contact support part 212 of the connection element 211 is cylindrical and has two sections in longitudinal direction where the cylindrical electric contacts 214 are mounted. In addition, a sleeve 215 with a thread is put over the connection link at an adequate and fixed position along the connection link. The BTE component housing (not shown) has again a cavity with spring contacts that make contact with the cylindrical contact on the inserted connection link. The two electrical spring contacts of different polarity are, in contrast to the embodiment of FIG. 25, arranged at a distance in axial direction to each other. Thus, the connection link can freely by positioned in angular direction and can be longitudinally positioned within a range given by the size of the cylindrical contacts, defined such to cover the desired variation of the adjustment-length. The BTE component further comprises a counterpart of the threaded sleeve. The sleeve and the BTE component counterpart may be made of different materials. The thread lead may be defined such that one full turn corresponds to for example 2 mm so that that length adjustment is done quickly. However, it is a disadvantage of such a solution, that the device has to be removed from the user's ear when a length adjustment has to be done. In contrast, the advantage is that the threads provide the longitudinal fixing and mechanical stability.

The connection link may have position markers on its outer surface that are visible and help the hearing professional to preset the length of the connection link or to control the physical fitting process.

Figure 26:
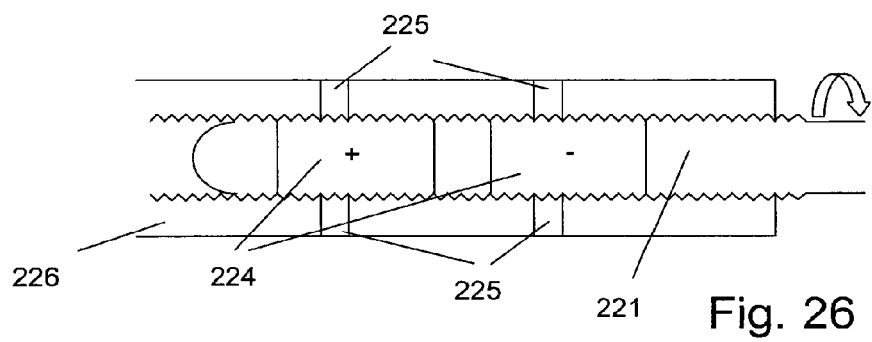
FIG. 26 a contact support part of a connection element with threaded contacts inserted in a corresponding threaded counterpart.
Figure 27:
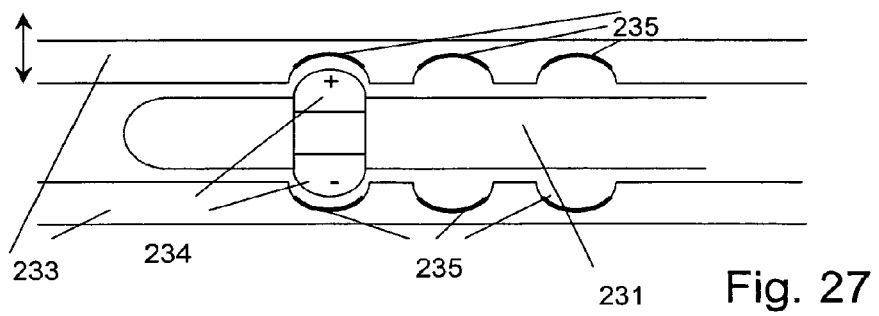
FIG. 27 a contact support part of a connection element with contacts that comprise a structure that form an interlocking mechanism, together with corresponding parts of the BTE component.

Referring to FIGS. 26 and 27, position variable contacts are described which are not slider contacts. In FIG. 26, the electrical contacts 224 of the connection element 221 (the first contacts) and the contacts 225 associated with the BTE component housing 226 (the second contacts) are both threaded. The two first contacts 224 for different polarity and the two second contacts each are arranged at a longitudinal distance from each other. In the spaces between the contacts of different polarity both, the threaded portions of the connection element and of the BTE component housing are electrically insulating. The first contacts and/or the second contacts are extended in longitudinal direction (in the shown configuration the first contacts only), so that an electrical contact is formed over a longitudinal range of different relative positions of the connection element 221 with respect to the BTE component housing. The solution of these figures could also be used for the in-the-ear-canal component to adjust the insertion depth.

The connection element 231 of FIG. 27 comprises a radially extending interlocking structure as previously described. In contrast to the embodiments described so far, however, the interlocking structure also carries electrical contacts 234 co-operating with corresponding contacts 235 of the matching interlocking structure of the BTE component housing 233.

Combinations or variations of the set-ups of the above embodiments may be envisaged, for example with a threaded contact for one polarity and a slider contact for another polarity other geometries, etc. In embodiments of the kind of FIGS. 22-24 and 27, where indentations and protrusions together form an interlocking structure, the BTE component may comprise the protrusions and the connection element the corresponding plurality of indentations.

In the following, the handling of a hearing device according to the second aspect of the invention and comprising a BTE component and an external receiver assembly consisting of a receiver preferentially embedded in a housing and mechanically and electrically attached to a connection link which preferably comprises a plastic tubing with inlayed conducting wires is described in three exemplary situations. The fourth use case (Component Identification) has no influence on the solutions presented herein but is mentioned for completeness.

First Case: First fit
Precondition:
The BTE device delivered to the hearing professional pre-assembled, i.e. the connection link of the external receiver assembly is fully inserted in the BTE component
Optionally the receiver housing is further attached to an ear canal fixation mean such as a custom made (open) otoplastic
Main Scenario
1. The hearing professional puts the BTE component behind the user's ear
2. The hearing professional places the receiver component (housing) into the ear canal
3. The hearing professional adjusts the connection length by pulling out the connection link at the BTE component, until a comfort fit is achieved
4. The hearing professional can reinsert the connection link into the BTE component, if required
5. The hearing professional applies a locking means to securely fix the length of the connection link
Post-condition
The BTE component with an external receiver is end-assembled according to the individual needs of the user
Second Case: Change of Receiver Type
Precondition
The BTE component with an external receiver of a certain type is assembled according to the use case 'First Fit'.
Main Scenario 1. The hearing professional unlocks the locking means
2. The hearing professional pulls out the external receiver assembly
3. The hearing professional inserts a new external receiver assembly (with a receiver of a different type)
4. The hearing professional continues with the use case 'First Fit'
   Post-condition
   The BTE component with a replaced external receiver is end-assembled according to the individual needs of the user
   Third Case: Service/Repair
   Precondition
   The BTE component with an external receiver is assembled according to the use case 'First Fit'
   The receiver or the connection link is damaged such that the external receiver assembly needs to be replaced
   Main Scenario
1. The hearing professional unlocks the locking means
2. The hearing professional pulls out the external receiver assembly
3. The hearing professional inserts a new external receiver assembly (with a receiver of the same type)
4. The hearing professional continues with the use case 'First Fit'
   Post-condition
   The BTE component with a replaced external receiver is end-assembled according to the individual needs of the user
   Fourth Case: Component Identification
   Precondition
   The BTE component device delivered to the hearing professional preassembled, i.e. the connection link of the external receiver assembly is fully inserted in the BTE component
   Or, the BTE component with an external receiver is assembled according to the use case 'First Fit'
   Or, the external receiver assembly has been replaced with the same or different type of receiver
   Optionally, the external receiver component is equipped with an identification module as described in WO 9909799
   Main Scenario
1. If automatic identification is possible, the hearing device checks during booting the components according to WO 9909799
2. Or the hearing professional enters manually the receiver type or changes the default value
3. The programming software causes to change and store the settings/operations in the memory of the hearing instrument
   Post-condition
   The BTE component with an external receiver is end-assembled and the configuration is stored in the memory of the hearing device Now, embodiments of the of the invention are described.

Figure 28:
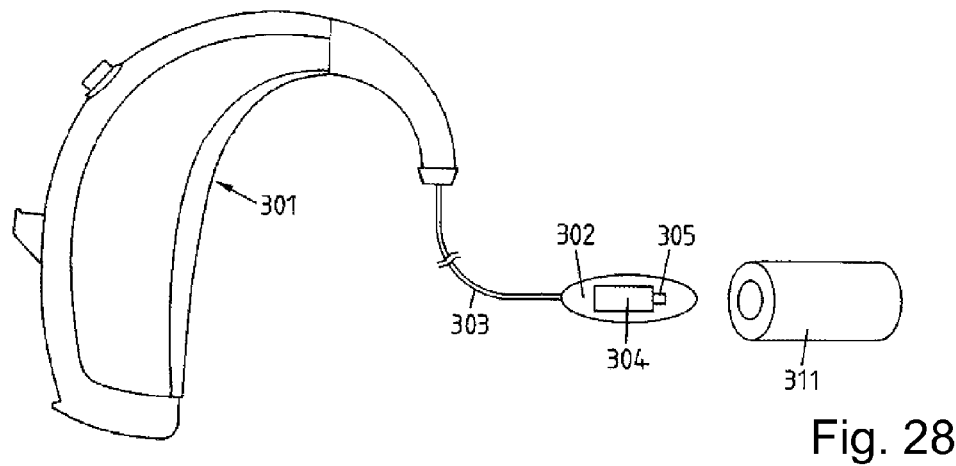
FIG. 28 a set-up according to the third aspect of the invention.

The hearing instrument of FIG. 28 comprises a BTE component 301 and an in-the-ear-canal component 302. Between the BTE component and the in-the-ear-canal component a connection element 303 is arranged. The connection element may optionally be built according to the second aspect of the invention. It comprises an electrical connection between sound processing means (not shown) in the BTE component and a receiver 304 arranged in the in-the-ear-canal component. It may—in accordance with an embodiment of the first aspect of the invention—further comprise sound conduction means for conducting sound produced by a further receiver being arranged in the BTE component. The BTE component may further comprise hook means or the like (not shown) for hooking it behind a user's ear.

The hearing instrument further comprises a fixation means 311 which in the figure is pictured as a tubular element for being introduced in the ear canal. The fixation means is operable to be positioned in the user's ear canal and to rest fixed therein. To this end, it is for example shaped to fit in the user's ear canal or it comprises—this is the preferred set-up—a self-expandable component that may establish itself in the ear canal. The fixation means 311 and the in-the-ear-canal component 302 are operable to be reversibly mechanically connected to each other.

In the shown embodiment, the fixation means preferably is self-expandable and has an outer diameter that is—when the fixation means is in an equilibrium position outside the ear—somewhat larger than an inner diameter of the ear canal. The inside of the tubular fixation means is—at least when the fixation means is inserted in the user's ear canal and in its designated position—operable to hold the inserted in-the-ear-canal component 302 in position.

In accordance with the third aspect of the invention, the fixation means is inserted in the ear canal without the in-the-ear-canal component by a hearing professional or by somebody else including the user himself. Then, the in-the-ear-canal component is inserted in the canal so that the sound bore 305 faces the tympanic membrane and connected to the fixation means.

The hearing instrument system realised by the hearing instrument according to FIG. 28 or the following figures illustrating embodiments of the third aspect of the invention may be as illustrated in FIG. 13, the description of which is, for reasons of conciseness, not repeated here. As an alternative, the hearing instrument system may comprise multiple receivers and for example be realized in accordance with FIG. 4 (or as in FIG. 4 but with woofer and tweeter exchanged).

Departing from FIG. 28, the hearing instrument system may be an in-the-canal or a completely-in-the-canal system where all constituents (except, of course, the fixation means) of the hearing instrument are arranged in the in-the-ear-canal component. The fixation system in accordance with the third aspect of the invention further is suited for fixing any other (non-hearing-aid) devices in the ear canal, for example receivers belonging to a radio system.

Figure 29:
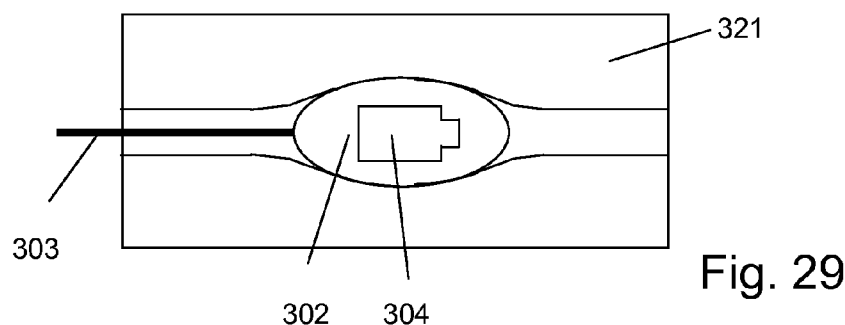
FIG. 29 a first embodiment of the third aspect of the invention in a schematic side view.

In a first embodiment illustrated in FIG. 29 the fixation means 321 is a hollow reversibly compressible tubular element, for example made of compressible foam. The tube has a length of for example about 15 to 20 mm and is made of biocompatible material. This tube is placed in the ear canal before the receiver component is inserted. The inner radius of the tube is such that when the tube is placed in the bony part of the ear canal, the largest cross-section is smaller than the cross section of the receiver component to be inserted.

The receiver component has for example an oval shape and a cross-section that is minimized with regard to the cross-section of the ear canal, such that the amount of cerumen that is pushed into the ear canal during insertion is minimized. During insertion the receiver component is guided into the tube with the help of the oval shape of the component and possibly with an increased inner radius at the lateral end of the scaffold. During insertion the walls of the scaffold are compressed, such that the pressure against the skin preferably does not exceed 0.05 N/mm2 in the pressure sensitive area of the ear canal, i.e. in the bony portion of the ear canal. Since the scaffold is longer than the receiver component the inner radius of the scaffold will be smaller than the maximum cross-section of the receiver component, which adds to the retention force, holding the receiver component longitudinally in place.

Figure 30:
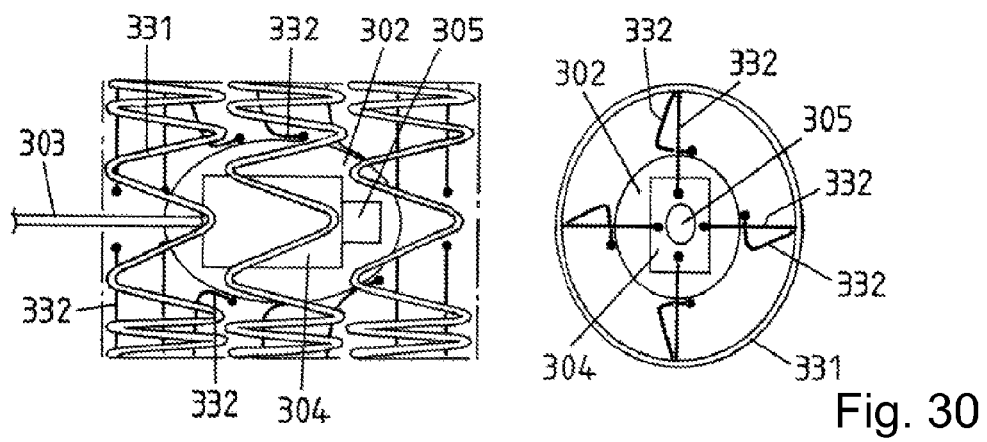
FIG. 30 a second embodiment of the third aspect of the invention in side view (left panel) and front view (seen from the tympanic membrane).

An example of a fixation element and an in-the-ear-canal component according to the second embodiment of the third aspect of the invention is shown in FIG. 30. The second embodiment is especially suited for placing the receiver deeply in the ear canal with minimum interference with the physiological environment. Since the microphone may be placed far from the receiver, it is possible to offer a non-occluding fixation of the receiver. As in the first embodiment, the assembly comprises two constituents placed in the ear canal. One constituent is the fixation means designed for long-term wear and serves as a scaffold to hold the receiver part in place, and the other constituent is the in-the-ear-canal component comprising the receiver itself which can be inserted and removed.

The fixation means comprises a tubular element, namely a self-expanding ear-canal stent 331, e.g. made of a mesh and is placed beyond the ear canal's isthmus. It is designed such that the pressure against the skin is minimized. A total length of between 10 mm and 20 mm is sufficient to produce enough retention force. The mesh structure allows maximum contact between the skin and the air which minimizes the physiological interferences.

The inner part of the stent 331 possesses holding elements 332 ('hairs') that are attached at the stent wall and point radially inward (FIG. 2). The hairs are highly flexible and bend easily.

The in-the-ear-canal component 302 contains only the receiver 304 in an oval housing as for the first embodiment. The oval shaped is designed such that it comprises a minimum overall volume. A thin cable 303 connects the receiver assembly to the BTE component. The receiver component is inserted using a gauge tool that guarantees the exact insertion depths. When inserted, the receiver component is for example located in the center of the ear-canal stent 331, held by the holding elements 332 that were bent during the insertion process. The insertion only minimally adds more pressure the stent walls and therefore to the skin. Hairs at the tube entrance and end are, after insertion of the receiver, in their original position and hold the receiver component longitudinally in place. The receiver component can be inserted and removed many times without irritating the skin.

In preferred realisations of the second embodiment, the holding elements are configured so as to provide an enforced resistance against longitudinal displacement while the radial pressure on the skin is kept minimal. In a first variant, shown in FIG. 31, holding elements 332.1 at or near the tube entrance (i.e. holding elements that are, when the in-the-ear-canal component 302 is inserted, towards on the side of the in-the-ear-canal component 302 towards the ear canal's exit, are stronger. This will somewhat enhance the forces during introduction of the in-the-ear-canal component 302, but provides mechanical stability against unwanted removal of the in-the-ear-canal component 302 without any additional force upon the ear canal skin, while the receiver 304 is in its intended position. The holding elements at the fixation means' end may also be stronger than the holding elements in a middle region so as to provide some resistance against an introduction of the in-the-ear-canal component 302 too far in the ear canal. As an alternative, also shown in FIG. 31, the fixation element comprises stopping means 333 serving as an abutment securely preventing the in-the-ear-canal component from being inserted too deep in the ear canal. Such stopping means are especially advantageous since usually the user herself/himself introduces the in-the-ear-canal component 302 in the already mounted fixation means. The stopping means 333 may for example be grid-like, where the grid lines are thin wires, or comprise at least two crossed wires across the tubular element's center.

Figure 31:
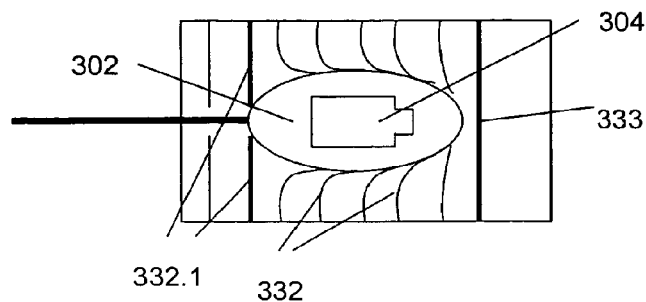
FIG. 31 a variant of the second embodiment of the third aspect of the invention including stopping means and enforced longitudinal fixation.
Figures 32, 33:
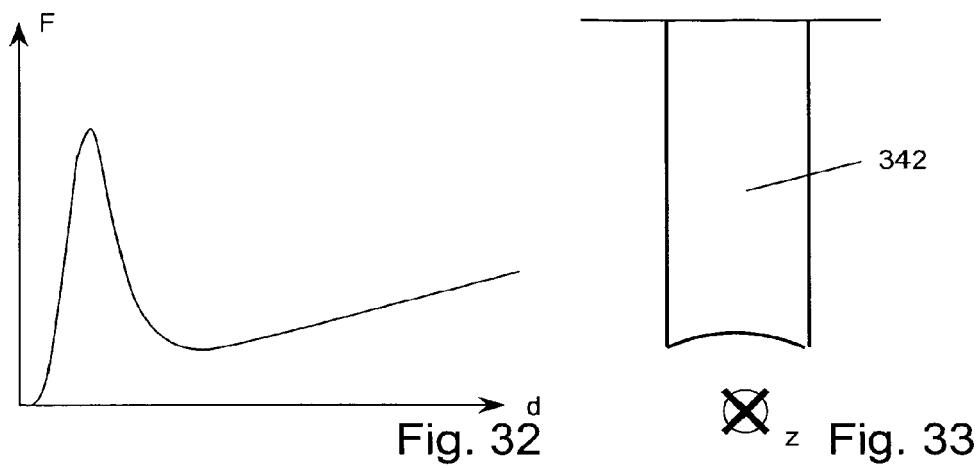
FIG. 32 an idealised force-versus-deflection diagram of a variant of a holding element.
FIG. 33 very schematically a variant of holding a holding element for a fixation means according to the second embodiment.

As an alternative or in addition to the set-up of FIG. 31, the holding elements may be such that they are especially stiff against an initial displacement, which is essentially in a longitudinal direction, where as a further displacement (primarily in radial direction) encounters a weaker resistance force. An example of such a non-linear dependence of the spring force on the displacement is shown in FIG. 32. The force-displacement curve has a pronounced peak at small displacements and for larger displacements becomes approximately linear as an ordinary spring. Such a behaviour—which may moreover be direction dependent (not shown)—is for example encountered for plate springs which are slightly bent around an axis which is at an angle (for example perpendicular) to the deflection direction, as illustrated in FIG. 33. FIG. 33 shows an example of a variant of a holding element 342 having such a non-linear behaviour. "z" in the figures denotes the longitudinal introduction direction. Due to this behaviour, the unbent holding elements provide an especially good hold against unwanted longitudinal displacement, whereas the bent holding elements at the place of the in-the-ear-canal component only exert a minimal radial force upon the stent-like tubular element. The realisation of FIGS. 32 and 33, compared to the realisation of FIG. 31, is especially preferred in situations where the end position of the in-the-ear-canal component within the fixation means is not pre-defined.

Figure 34:
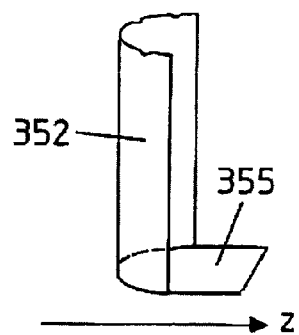
FIG. 34 a holding element as in FIG. 32 additionally comprising a barb means.

In addition or as an alternative, the holding elements 352 may comprise barb-like structures 355 which provide yet an additional resistance against unwanted removal of the in-the-ear-canal component, as sketched in FIG. 34. The barb-like structures may get caught in corresponding features on the back side of the in-the-ear-canal component housing (not shown). This additional measure allows to make the spring constant of the holding element even weaker, so as to yet again reduce the radial pressure upon the tubular element.

Figure 35:
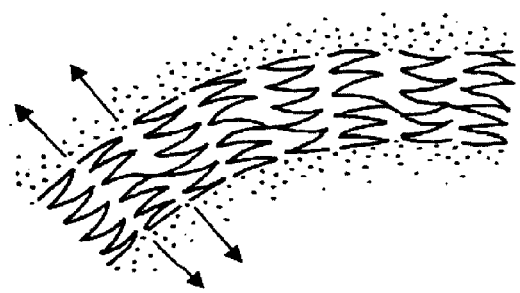
FIG. 35 a picture of a self-expandable stent for serving as tubular element for a fixation means according to the second embodiment of the third aspect of the invention.
Figure 36:
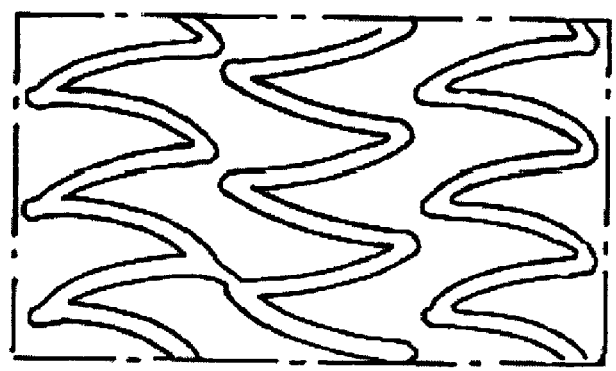
FIG. 36 a detail of a mesh structure of the stent of FIG. 35.

An example of a tubular element 331 (without the holding elements) is shown in FIG. 35. The tubular element is self-expandable due to a mesh structure shown in more detail in FIG. 36. It may be of a kind already known from stents for medical applications and may be made of titan and/or stainless steel and/or other suitable material compositions including synthetics.

Figure 37:
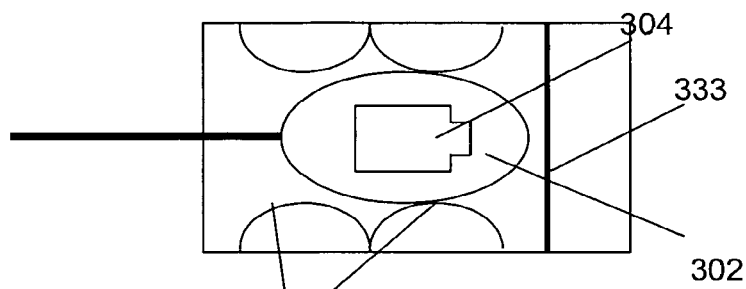
FIG. 37 an alternative variant of the second embodiment of the third aspect of the invention.

In FIG. 37 a realisation of the second embodiment is shown, where the holding elements 362 are not hair-like but are springs radially extending from the inside of the tube.

In the following, embodiments of the fourth aspect of the invention are described.

Figure 38:
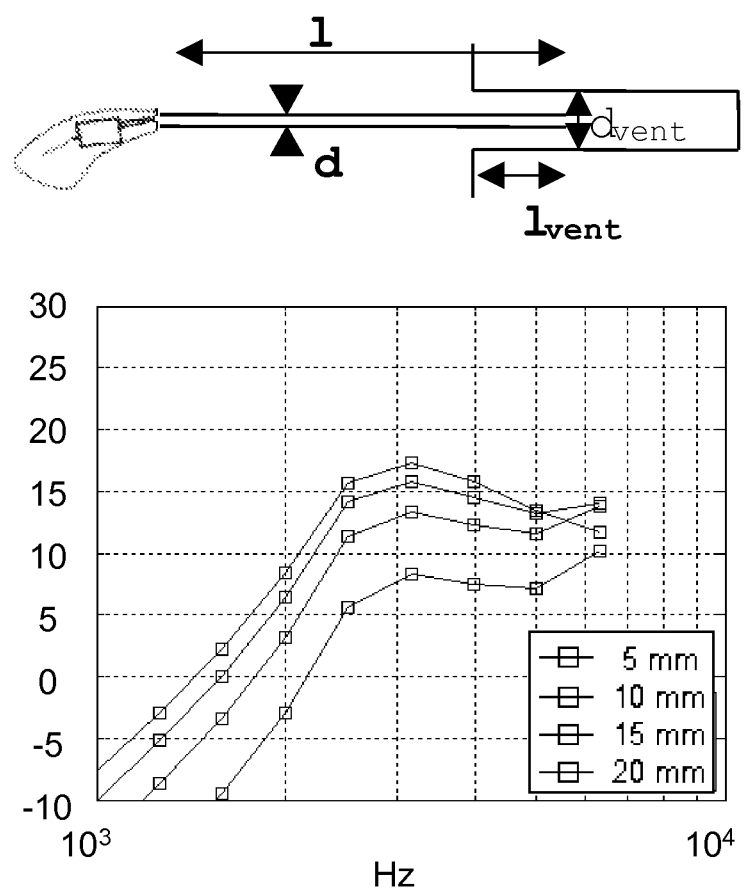
FIG. 38 an illustration of a typical dependence of the acoustic response on the longitudinal position of a earpiece in an ear canal.
Figure 39:
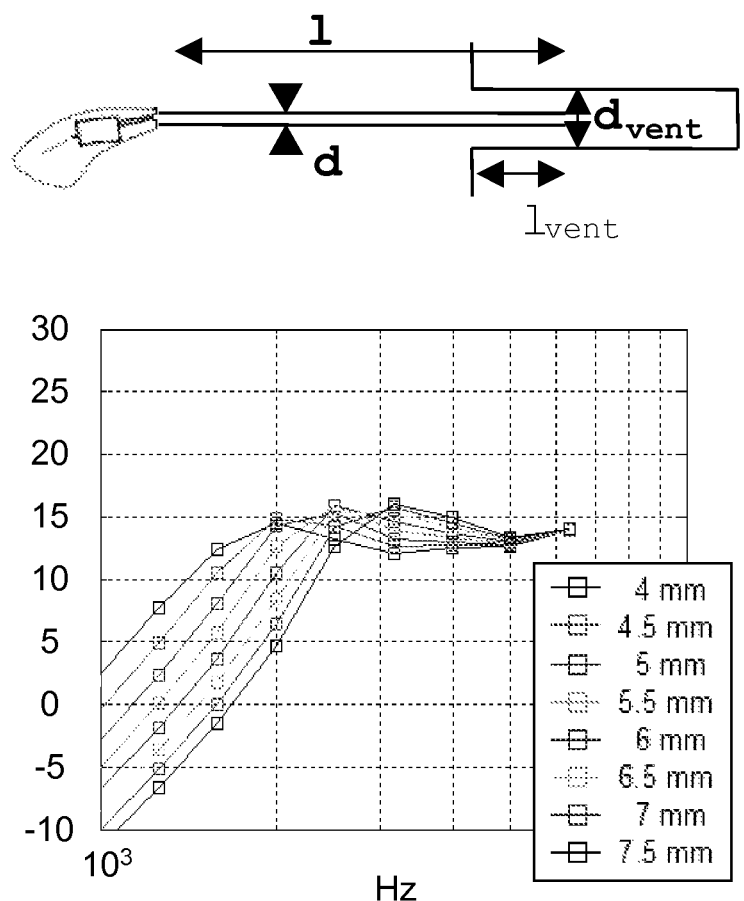
FIG. 39 an illustration of a typical dependence of the acoustic response on the diameter of a vent in an earpiece.

FIGS. 38 and 39 are shown in order to illustrate an advantage of the fourth aspect of the invention over the universal-fit holder solutions according to the prior art. In such universal-fit holders, the positioning of the receiver within the ear canal is not predictable and often not satisfactorily reproducible. The effective vent size is a priori not known since it is defined by the ear canal geometry. The resulting variations of the acoustic coupling are shown based on a model situation in FIGS. 38 and 39.

FIG. 38 shows the Real-Ear-to-Coupler-Difference (RECD) of a model tube with a fixed vent diameter, which model tube is inserted in a model ear canal, as illustrated in the left panel. The RECD is the difference between the sound pressure level in a 2 cm3 coupler (being an idealised ear canal) used for standard measurements the closed ear canal and the actual sound pressure level in the real ear. The curves in the right panel show the frequency dependence of the RECD for different vent positions lvent. As can be estimated from the figure, an uncertainty of insertion depth of around 1 mm would correspond to changes of RECD in the order of 3 dB@2 kHz.

FIG. 39 shows the corresponding situation when the vent diameter dvent is varied at a constant vent position. An uncertainty of opening area translated to an uncertainty of the effective vent size of about 1 mm due to missing information about the ear canal geometry would correspond to changes of RECD in order of 5 dB@2 kHz.

Figure 40:
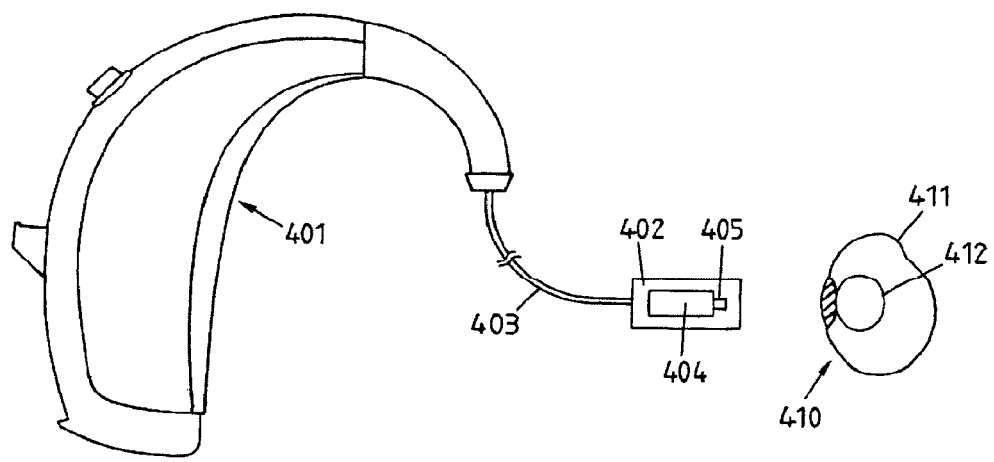
FIG. 40 a set-up according to the fourth aspect of the invention.

The hearing instrument of FIG. 40 comprises a BTE component 401 and an in-the-ear-canal component 402. Between the BTE component and the in-the-ear-canal component a connection element 403 is arranged. The connection element may optionally be built according to the second aspect of the invention. It comprises an electrical connection between sound processing means (not shown) in the BTE component and a receiver 404 arranged in the in-the-ear-canal component. It may—in accordance with an embodiment of the first aspect of the invention—further comprise sound conduction means for conducting sound produced by a further receiver being arranged in the BTE component. The BTE component may further comprise hook means or the like (not shown) for hooking it behind a user's ear.

The hearing instrument further comprises a fixation means 410. The fixation means is shaped to fit in the user's ear canal and to rest fixed therein. The fixation means 410 and the in-the-ear-canal component 402 are operable to be mechanically connected to each other. This mechanical connection may be permanent or, preferably, may be reversible.

In preferred embodiments, the fixation means is shaped to fit in an outer portion of the ear canal, i.e. outwards of the isthmus. In most embodiments, the in-the-ear-canal component 402 is mechanically connected to the fixation means outside of the ear canal and inserted in the ear canal together with the fixation means.

The hearing instrument system realised by the hearing instrument according to FIG. 40 or the following figures illustrating embodiments of the third aspect of the invention may be as illustrated in FIG. 13, the description of which is, for reasons of conciseness, not repeated here. As an alternative, the hearing instrument system may comprise multiple receivers and for example be realised in accordance with FIG. 4 (or as in FIG. 4 but with woofer and tweeter exchanged).

Departing from FIG. 40, the hearing instrument system may be an in-the-canal or a completely-in-the-canal system where all constituents (except, of course, the fixation means) of the hearing instrument are arranged in the in-the-ear-canal component.

An example of the fixation means 400 is shown in more detail in FIG. 41. FIG. 41 depicts a front view (left upper panel), a side view including an in-the-ear-canal component (right upper panel), and a top view (lower panel) of a fixation means in each case in section. The fixation means comprises an outer shell 421 which is shaped to fit in the user's ear canal. Affixed to the outer shell by means of a support structure 423 is an inner shell 422 which is formed to receive and hold the in-the-ear-canal component 402. For example, the inner shell is resilient (in fact, it may be made of the same material as the outer shell) and has an inner diameter that is slightly smaller than an outer diameter of the in-the-ear-canal component 402. The fixation means further comprising a locking mechanism locking the in-the-ear-canal component once it has been fully introduced into the inner shell. The locking mechanism in the shown example comprises a cantilever 424 with a locking protrusion 425. When the in-the-ear-canal component 402 is introduced in the inner shell, the cantilever is swivelled outward in a radial direction, until the locking protrusion 425 snaps in a corresponding locking indentation 426 of the in-the-ear-canal component.

The shell is preferably made of polyamide. In order to achieve optimized fit of the shell within the user's outer ear and ear canal, the shell preferably has an outer surface individually shaped according to the measured shape of the user's outer ear and ear canal, i.e. the shell preferably has an individually customized outer shape. The shape of the user's outer ear and ear canal may be determined by direct three-dimensional scanning of the ear canal and the concha or by producing an impression of the ear canal and the concha which subsequently undergoes scanning. The scanning process may be carried out optically, preferably by laser scanning.

The digital data obtained by the scanning process is then used to create the hard shell by an additive or incremental layer-by-layer build up process. Such processes are also known as "rapid prototyping". A preferred additive build-up process is a layer-by-layer laser sintering process of powder material, preferably polyamide powder. Such processes are also known as "selective laser sintering" (SLS). The basic principle therein is the repeated deposition of a thin layer of material on a surface, with the desired sectional shape then being stabilized, i.e. hardened, by laser action. Other preferred additive layer-by-layer build-up processes are laser stereo-lithography or photo-polymerization. An overview regarding additive layer-by-layer build-up processes for producing customized shells for hearing aids can be found, for example, in US 2003/013358 A1 or U.S. Pat. No. 6,533,062 B1.

Between the outer shell 421 and the inner shell 422 a passage 429 remains open. In the shown embodiment, the cross section of the passage is larger than the cross section of the inner shell with the in-the-ear-canal component.

The length in a longitudinal direction, i.e., a direction corresponding to the ear canal axis, of the outer shell and of the inner shell is approximately equal to the longitudinal length of the in-the-ear-canal component.

The in-the-ear-canal component 402 for example comprises a housing with a universal shape (i.e., the shape is independent of the individual's ear and the same for all users) and comprises a shape which allows mounting of the in-the-ear-canal component to different kinds of fixation means.

Even though the fixation mean is shaped to the individual ear geometry, it is possible to use the actual and real vent dimensions (dimension of the passage) for optimizing the acoustic coupling during the fitting process. This is because the manufacturing is of the fixation mean is based on digitized data and both vent size and insertion depth are controlled parameters.

The outer shell may be formed by an outer shell wall that is continuous or that comprises wall openings 431 as is illustrated in FIG. 42. The outer shell may as an alternative comprise an otherwise open structure, such as a mesh structure. An structure with wall openings or an otherwise open structure has the aim to reduce the amount of material to a minimum while still imaging the individual ear canal geometry, to favour the resilient behaviour and at the same time to support minimal interference with the skin physiology.

Alternative embodiments of the fixation means are shown in front view in FIG. 43. The inner shells 442, 452 of the variants A and B are arranged asymmetrically near a wall of the ear canal. In variant A, the wall of the inner shell in a section coincides with the wall 441 of the outer shell, whereas in variant B a support structure 453 is arranged between the inner shell 452 and the outer shell 451 and provides an additional mechanical de-coupling between the canal wall and the in-the-ear-canal component. This may be advantageous for situations where the in-the-ear-canal component noticeably vibrates when low frequency sounds are produced be the receiver. The mechanical de-coupling prevents the vibrations from being transferred to the canal wall where they may cause a tickling sensation. In variant C, the inner shell 462 is located centrally within the outer shell 461 and is held by a suspension structure 463 that comprises holding elements that extend essentially radially from the inner shell to the outer shell but that are shaped so as to not exert too strong a spring force against deformations of the outer shell (i.e. they may for example be sheet like and bended as illustrated in the figure).

The outer shell and the mounting structure (in all so far described embodiments, the mounting structure comprises an inner shell), though such a design is preferred, both need not be circumferential, i.e. need not, in at least one section, form a closed shape surrounding the ear canal on an interior or the in-the-ear-canal component on an exterior side, respectively. An example of an embodiment where the outer shell 471 is not circumferential is shown in FIG. 44. The outer shell in an upper portion is completely open. The elasticity of the outer shell material and the spring force of the holding elements of the support structure 473 nevertheless causes the outer shell to rest against the canal wall once the fixation means is inserted. In the embodiment of FIG. 45, the outer shell 481 is circumferential, but the mounting structure comprises an inner shell 482 that is made of two inner shell proportions for framing the in-the-ear-canal component from two sides (in the figure from an upper and a lower side). In both, FIG. 44 and FIG. 45, the inner shell 472, 482 is held centrally in the ear canal by the support structure 473, 483.

In FIG. 46, a locking mechanism for locking the in-the-ear-canal component 502 in the inner shell 492 is illustrated in more detail. The locking mechanism may be a snap-in-twist-off mechanism where the in-the-ear-canal component may be removed by being twisted relative to the fixation means. Apart from the locking mechanism—which may be provided by a cantilever-like spring 494—the locking mechanism does not require any additional tools.

What is claimed is:

1. A hearing instrument, comprising:
   an outside-the-canal component adapted to be placed, in an operating state of the hearing instrument, outside the user's ear canal, the outside-the-canal component comprising at least one microphone, signal processing means and a first receiver;
   the hearing instrument further comprising an in-the-ear-canal component adapted to be placed, in an operating state of the hearing instrument, in the ear canal, the in-the-ear-canal component comprising a second receiver;
   the first and second receivers being operatively connected with the microphone via the signal processing means;
   the first and the second receivers having a different frequency response;
   the hearing instrument comprising a sound transmission channel from the first receiver to the ear canal, and comprising an electric signal transmission channel from the signal processing means to the in-the-ear-canal component.

2. A hearing instrument according to claim 1, wherein the outside-the-canal component is a behind-the-ear component fitting behind a user's ear.

3. A hearing instrument according to claim 2 comprising the electric signal transmission channel comprising a connection link with at least two electrical contact lines, the connection link being reversibly connectable to at least one of the behind-the-ear component and of the in-the-ear-canal component, the connection link having a length that is reversibly adjustable, and the hearing instrument comprising fixation means for reversibly fixing the adjusted length of the connection link.

4. A hearing instrument according to claim 3, further comprising a fixation means adapted to fit in the user's ear canal and to be fixed therein, wherein the in-the-ear-canal component is reversibly connectable to the fixation means when the fixation means are positioned in the ear canal and reversibly detachable from the fixation means when the fixation means are positioned in the ear canal.

5. A hearing instrument, according to claim 3, further comprising a fixation means for fixing the in-the-ear canal component in a user's ear, the fixation means comprising an outer shell shaped to fit in the user's ear canal and an in-the-ear-canal component mounting structure mechanically coupled to the outer shell and being shaped to hold the in-the-ear-canal component, wherein the in-the-ear-canal component is reversibly mountable to the fixation means, and wherein the fixation means is shaped so as to maintain a passage from an outside to an interior of the ear canal when the in-the-ear-canal component is inserted.

6. A hearing instrument according to claim 1, wherein the sound transmission channel comprises a sound conduction tube leading from the first receiver to the ear canal.

7. A hearing instrument according claim 6, wherein the electric signal transmission channel is mechanically coupled to the sound conduction tube.

8. A hearing instrument according to claim 1, wherein the signal processing means are operable to feed the first receiver with a first signal of a first central frequency and the second receiver with a second signal of a second central frequency.

9. A hearing instrument according to claim 1, wherein the signal processing means comprise a signal processing unit having an input, a first output and a second output, the input being operatively connected an output of the at least one microphone, the first output being operatively connected to the first receiver and the second output being operatively connected to the second receiver, wherein the signal processing unit is operable to produce a first output signal of a first central frequency and a second output signal with a second central frequency, wherein the first output signal is directed to the first output, wherein the second output signal is directed to the second output.

10. A hearing instrument according to claim 1, wherein the signal processing means comprise two signal processing units, an input of both of which is operatively connected to an output of the microphone, and wherein the gain characteristics of the two signal processing units is such that one of the signal processing units is operable to predominantly amplify first proportions of an input signal and the other one is operable to predominantly amplify second proportions of an input signal.

11. A hearing instrument according to claim 1 wherein the signal processing means comprise a signal processing unit having an input and an output, the input being operatively connected to an output of the microphone, and a frequency separating filter an input of which is operatively connected to an output of the signal processing unit.

12. A hearing instrument according to claim 1 wherein the signal processing means comprise a signal processing unit having an input and an output, the input being operatively connected to an output of the microphone, the output being operatively connected to both, the first and the second receiver, so that both receivers, in an operating state, are fed by identical input signals.

13. A hearing instrument according to claim 1, further comprising a fixation means adapted to fit in the user's ear canal and to be fixed therein, wherein the in-the-ear-canal component is reversibly connectable to the fixation means when the fixation means are positioned in the ear canal and reversibly detachable from the fixation means when the fixation means are positioned in the ear canal.

14. A hearing instrument, according to claim 1, further comprising a fixation means for fixing the in-the-ear canal component in a user's ear, the fixation means comprising an outer shell shaped to fit in the user's ear canal and an in-the-ear-canal component mounting structure mechanically coupled to the outer shell and being shaped to hold the in-the-ear-canal component, wherein the in-the-ear-canal component is reversibly mountable to the fixation means, and wherein the fixation means is shaped so as to maintain a passage from an outside to an interior of the ear canal when the in-the-ear-canal component is inserted.

* * * * *